US011206278B2

(12) United States Patent
Veeramany et al.

(10) Patent No.: US 11,206,278 B2
(45) Date of Patent: Dec. 21, 2021

(54) RISK-INFORMED AUTONOMOUS ADAPTIVE CYBER CONTROLLERS

(71) Applicant: Battelle Memorial Institute, Richland, WA (US)

(72) Inventors: Arun Veeramany, Richland, WA (US); William James Hutton, III, Benton City, WA (US); Siddharth Sridhar, Seattle, WA (US); Sri Nikhil Gupta Gourisetti, Richland, WA (US); Garill A. Coles, Richland, WA (US); Mark J. Rice, Richland, WA (US); Paul M. Skare, Richland, WA (US); David O. Manz, Pasco, WA (US); Jeffery E. Dagle, Richland, WA (US); Stephen D. Unwin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 298 days.

(21) Appl. No.: 16/432,655

(22) Filed: Jun. 5, 2019

(65) Prior Publication Data

US 2020/0244691 A1 Jul. 30, 2020

Related U.S. Application Data

(60) Provisional application No. 62/798,315, filed on Jan. 29, 2019.

(51) Int. Cl.
*H04L 29/06* (2006.01)
*H04L 12/24* (2006.01)

(52) U.S. Cl.
CPC ........ *H04L 63/1433* (2013.01); *H04L 41/142* (2013.01); *H04L 41/16* (2013.01);
(Continued)

(58) Field of Classification Search
CPC ... H04L 63/1433; H04L 41/142; H04L 41/16; H04L 63/0236; H04L 63/1416; H04L 63/20
(Continued)

(56) References Cited

U.S. PATENT DOCUMENTS

| 7,013,395 | B1 * | 3/2006 | Swiler | H04L 63/1433 713/151 |
| 2007/0136788 | A1 * | 6/2007 | Monahan | H04L 63/20 726/3 |
| 2013/0347116 | A1 * | 12/2013 | Flores | H04L 63/1433 726/25 |

OTHER PUBLICATIONS

Arlitt et al., "Impacts of Function-Related Research on Education and Industry," in Chakrabarti et al., Impact of Design Research on Industrial Practice, pp. 77-99 (*Springer International Publishing* 2016) (89 pages submitted including front/rear matter and Arlitt chapter).

(Continued)

*Primary Examiner* — Jacob Lipman
(74) *Attorney, Agent, or Firm* — Klarquist Sparkman, LLP

(57) ABSTRACT

Technology related to risk-informed autonomous adaptive cyber controllers is disclosed. In one example of the disclosed technology, a method includes generating probabilities of a cyber-attack occurring along an attack surface of a network. The probabilities can be generated using sensor and operational data of a network as inputs to an attack graph. The risk scores can be determined using a plurality of fault trees and the generated probabilities from the attack graph. The respective risk scores can correspond to respective nodes of an event tree. The event tree and the determined risk scores can be used to determine risk estimates for a plurality of configurations of the network. The risk estimates for the plurality of configurations of the network can
(Continued)

be used to reconfigure the network to reduce a risk from the cyber-attack.

19 Claims, 15 Drawing Sheets

(52) U.S. Cl.
CPC ...... *H04L 63/0236* (2013.01); *H04L 63/1416* (2013.01); *H04L 63/20* (2013.01)
(58) Field of Classification Search
USPC .......................................................... 726/25
See application file for complete search history.

(56) References Cited

OTHER PUBLICATIONS

Atighetchi et al., "Adaptive Use of Network-Centric Mechanisms in Cyber-Defense," *Proceedings of the 2nd IEEE International Symposium on Network Computing and Applications*, Apr. 2003, 10 pp.
Byres et al., "The Use of Attack Trees in Assessing Vulnerabilities in SCADA Systems," *25th IEEE Conference on International Infrastructure Survivability Workshop*, Dec. 2004, 10 pp.
Cahn et al., "Software-Defined Energy Communication Networks: From Substation Automation to Future Smart Grids," *2013 IEEE International Conference on Smart Grid Communications (SmartGridComm)*, Oct. 2013, pp. 558-563.
Cebula et al., "A Taxonomy of Operational Cyber Security Risks," *Carnegie-Mellon University Software Engineering Institute*, Dec. 2010, 47 pp.
Cybenko et al., "Adversarial and Uncertain Reasoning for Adaptive Cyber Defense: Building the Scientific Foundation," *10th International Conference on Information Systems Security*, Dec. 2014, pp. 1-8.
Cherdantseva et al., "A review of cyber security risk assessment methods for SCADA systems," *Computers & Security*, vol. 56, Feb. 2016, pp. 1-27.
Ezell, "Risks of Cyber Attack to Water Utility Supervisory Control and Data Acquisition for Water Supply," Thesis, *University of Arizona*, May 1998, 80 pp.
FIRST.Org, Inc., "Common Vulnerability Scoring System v3. 0: Specification Document," 2015, 21 pp.
Frigault et al., "Measuring Network Security Using Dynamic Bayesian Network," *Proceedings of the 4th ACM workshop on Quality of protection*, Oct. 2008, pp. 23-30.
Hassani et al., "Cyber Security Issues in Navigation Systems of Marine Vessels from a Control Perspective," *Proceedings of the ASME 2017 36th International Conference on Ocean, Offshore, and Arctic Engineering*, Jun. 2017, 16 pp.
Kaplan et al., "On the Quantitative Definition of Risk," *Risk Analysis*, vol. 1, No. 1, Mar. 1981, pp. 11-27.
Karnouskos, "Stuxnet Worm Impact on Industrial Cyber-Physical System Security," *IECON 2011-37th Annual Conference on IEEE Industrial Electronics Society*, Nov. 2011, pp. 4490-4494.

Moreira et al., "Cyber-Security in Substation Automation Systems," *Renewable and Sustainable Energy Reviews*, vol. 54, Feb. 2016, pp. 1552-1562.
Mosleh, "PRA: A Perspective on Strengths, Current Limitations, and Possible Improvements," *Nuclear Engineering and Technology*, vol. 46, Issue 1, Feb. 2014, pp. 1-10.
Oveisi et al., "SFTA-Based Approach for Safety/Reliability Analysis of Operational Use-Cases in Cyber-Physical Systems," *Journal of Computing and Information Science in Engineering*, vol. 17, Sep. 2017, p. 031018-01-031018-11.
Radisavljevic-Gajic et al., "Vulnerabilities of Control Systems in Internet of Things Applications," *IEEE Internet of Things Journal*, vol. 5, Issue 2, Apr. 2018, pp. 1023-1032.
Radisavljevic-Gajic et al., "Vulnerabilities of Cyber-Physical Linear Control Systems to Sophisticated Attacks," *Proceedings of the ASME 2017 Dynamic Systems and Control Conference*. Oct. 2017, 9 pp.
Ralston et al., "Cyber Security Risk Assessment for SCADA and DCS Networks," *ISA Transactions*, 46(4), pp. 583-594 (2007).
Rosa et al., "A Comparative Study of Correlation Engines for Security Event Management," *ICCWS 2015—The Proceedings of the 10th International Conference on Cyber Warfare and Security*, Apr. 2015, 11 pp.
Russell et al., "Systems Analysis Programs for Hands-on Integrated Reliability Evaluations (SAPHIRE) Version 5.0," *EG and G Idaho, Inc; Nuclear Regulatory Commission; Office of Nuclear Regulatory Research*; Oct. 1995, 113 pp.
Ruijters et al., "Fault Tree Analysis: A survey of the state-of-the-art in modeling, analysis and tools," *Computer Science Review*, vols. 14-16, Feb.-May 2015, pp. 29-62.
Sajid et al., "Cloud-Assisted IoT-Based SCADA Systems Security: A Review of the State of the Art and Future Challenges," *IEEE Access*, vol. 4, Mar. 2016. pp. 1375-1384.
Sarkar, "Autonomous Perception and Decision Making in Cyber-Physical Systems," Doctoral Dissertation, *The Pennsylvania State University*, Aug. 2011, 226 pp.
Turk, "Cyber Incidents Involving Control Systems," *Idaho National Laboratory*, Oct. 2005, 58 pp.
Veeramany et al., "A Framework for Development of Risk-Informed Autonomous Adaptive Cyber Controllers," *Journal of Computing and Information Science in Engineering*, Dec. 2019, vol. 19, pp. 041004-2-041004-10.
Wang et al., "An Attack Graph-Based Probabilistic Security Metric," © *IFIP International Federation for Information Processing 2008*, vol. 5094, 2008; pp. 283-296.
Whyte, "Using a Systems-Theoretic Approach to Analyze Cyber Attacks on Cyber-Physical Systems," *Massachusetts Institute of Technology*, Feb. 2017, 118 pp.
Williams, The Purdue Enterprise Reference Architecture and Methodology (PERA), *Handbook of Life Cycle Engineering: Concepts, Models, and Technologies*, 1998, 48 pp.
Wood et al., "An Autonomous Control Framework for Advanced Reactors," Nuclear Engineering and Technology, vol. 49, Issue 5, Aug. 2017, pp. 296-904.
Wu et al., "Risk Assessment Method for Cybersecurity of Cyber-Physical Systems Based on Inter-Dependency of Vulnerabilities," *2015 IEEE International Conference on Industrial Engineering and Engineering Management (IEEM)*, Dec. 2015, pp. 1618-1622.

\* cited by examiner

FIG. 12

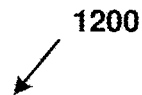

| Event | Likelihood/Value | | Event Description |
|---|---|---|---|
| | Without Controller | With Controller | |
| E11 | 5% | Already happened | staff failing to identify unauthorized email |
| E12 | 100% | Already happened | the attacker exploiting the vulnerability |
| E13 | 90% | Detected | failure to detect malware download |
| E14 | 100% | N/A | failure to detect malware invocation |
| A15 (Rerouted to sandbox) | N/A | 1% | Given that malware was detected, 99% chance that rerouting is successful with 10 sec 1 GW loss (or 1% chance that rerouting is failed with 10 min 1 GW loss) |
| Path vulnerability (product of above) | 4.5% | 1% | |
| Consequence | 1 GW | 1 GW | Total consequence if no action is taken |
| Time to recover from loss | 1 hr | 10 min | 10 min if already detected and failed to reroute (1% likely). Detection certainty allows for immediate remedial action if not rerouted. |
| Time to reconfigure | N/A | 10 sec | 10 sec if already detected and rerouted (99% likely) |
| Risk (GWh) as per Eq 1. | 45 MWh | ~4 MWh | (4.5%)(1GW)(1hr) and (99%)(1GW)(10 sec) + (1%)(1GW)(10 min) respectively |

RISK-INFORMED AUTONOMOUS ADAPTIVE CYBER CONTROLLERS

CROSS-REFERENCE TO RELATED APPLICATIONS

This application claims the benefit of U.S. Provisional Application Ser. No. 62/798,315, titled "RISK-INFORMED AUTONOMOUS ADAPTIVE CYBER CONTROLLERS," filed on Jan. 29, 2019, which application is incorporated in its entirety by reference herein.

ACKNOWLEDGMENT OF GOVERNMENT SUPPORT

This invention was made with Government support under Contract DE-AC05-76RL01830 awarded by the U.S. Department of Energy. The Government has certain rights in the invention.

BACKGROUND

Critical infrastructure systems can include physical and virtual assets, systems, and networks that are vital to a country's security, economic security, and/or public health or safety. Critical infrastructure systems can be used for manufacturing civilian and military products, generating and transmitting energy, managing waterways and dams, managing transportation systems and the traffic flowing on those systems, enabling civilian and military communications, managing financial services and the flow of money, managing and tracking the production and storage of commodities (such as agricultural products), maintaining the health and safety of patients, and protecting private data (such as health records). An adversary may attempt to exploit vulnerabilities within cyber infrastructure of the critical systems in order to damage or disrupt the system and/or to obtain private information. The release of private information and/or the incapacitation or destruction of components of critical infrastructure systems can have a debilitating effect on security, national economic security, national public health or safety. Accordingly, there is ample opportunity to strengthen and maintain secure, functioning, and resilient critical infrastructure.

SUMMARY

Apparatus and methods for risk-informed autonomous adaptive cyber controllers are disclosed. In one example, a method includes generating probabilities of a cyber-attacks occurring along one or more attack surfaces of a computer network. The probabilities can be generated using sent sores and operational data of the computer network as inputs to attack graph. In some examples, the risk scores can be turned determined using a plurality of fault tree's and the generated probabilities. As one example of a practical application of the disclosed technology, the event tree and the determined risk scores can be used to determine risk estimates for at least one configuration of the computer network. As another example of a practical application of the disclosed technology, the determined risk estimates for the network can be used to reconfigure the computer network to reduce risk of cyber-attack.

In one example of the disclosed technology, a cyber controller is configured to monitor a system and control a computer network coupled to the system by generating attack data based on an attack graph. The cyber controller is coupled to a processor executing computer-readable instructions that cause the processor to receive attack data from the cyber controller, determined risk scores representing probabilities that a cyber at his under away with the received attack data and at least one fault tree, use the determined risk scores and an event tree to determine risk estimates for at least one configuration of the network. As one example of a practical application of the disclosed apparatus, the processor can be used to provide risk estimates for the plurality of configurations of the network for the controller to use in controlling the network. As another example of a practical application of the disclosed apparatus, the risk estimates for the network can be used to reconfigure the computer network to reduce risk of cyber-attack.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 12 is a table illustrating an example of risk estimation with and without a cyber controller, as can be implemented in certain examples of the disclosed technology.

DETAILED DESCRIPTION

General Considerations

Figure 1:
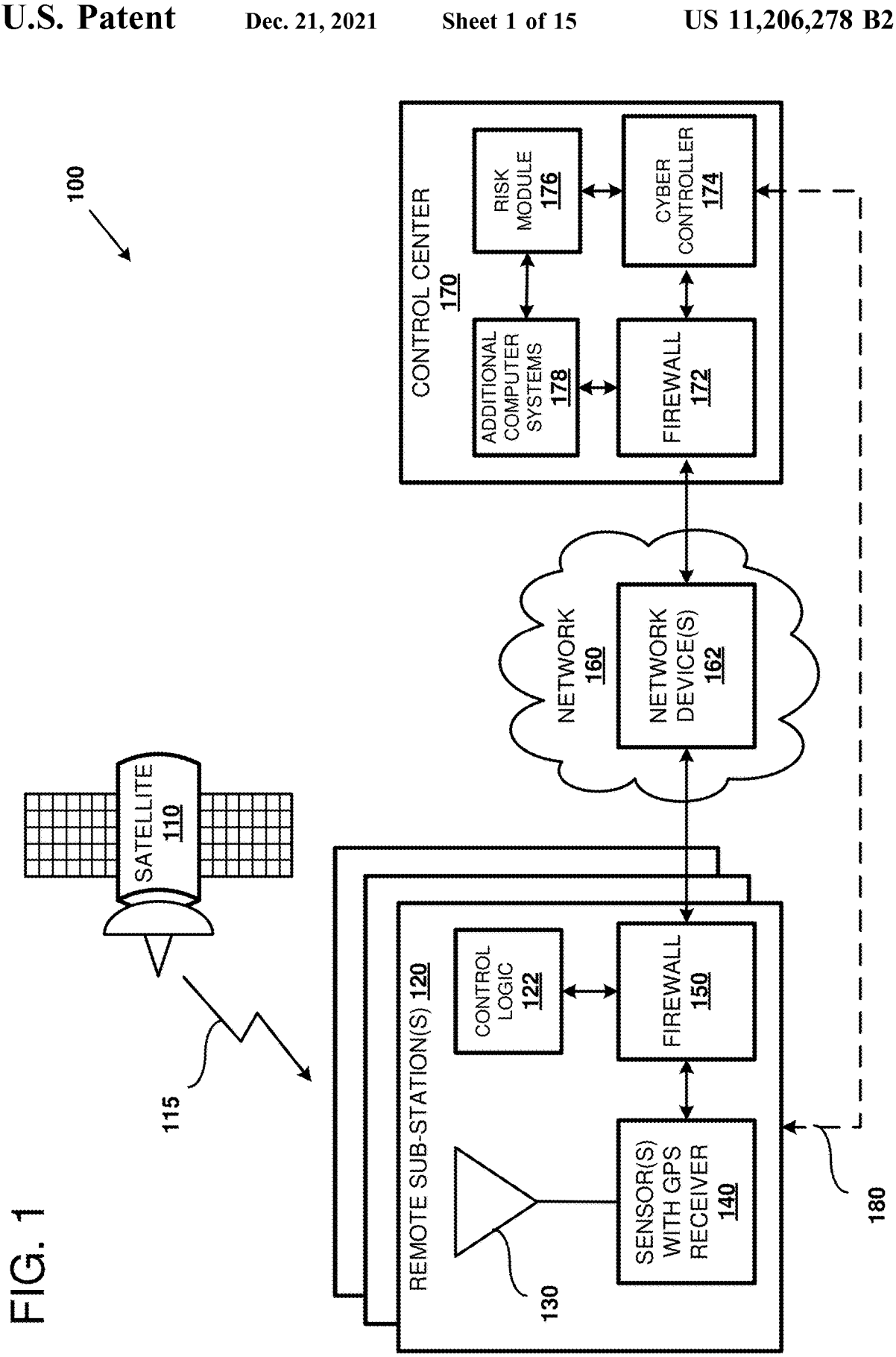
FIG. 1 is a system diagram of an example of cyber-physical system including a cyber controller and a risk module.

This disclosure is set forth in the context of representative examples that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed examples, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed examples can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed examples, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or application-specific processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood to one of ordinary skill in the relevant art having the benefit of the present disclosure that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based examples (comprising, for example, computer-readable instructions that when executed, cause a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Overview

A cyber controller is hardware, software, or a combination of software and hardware that can be used to monitor and control a computer network. For example, the cyber controller can monitor equipment, systems, databases, and activity of the network and the computer systems attached to the network. An adversary may desire to disrupt the network and/or the attached systems. An adversary may desire to read or modify data that is stored on the system and/or transmitted within the network. The cyber controller can monitor the computer network to evaluate and classify potential threats to the network and to the attached computer systems. An adaptive cyber controller can reconfigure the computer network, such as in response to detecting a potential threat. For example, the adaptive cyber controller can change or reconfigure components of the network so that the network operates differently than before the reconfiguration. By changing operational parameters of the network, an adversary can be disconnected from the network, or be deceived or confused as to how to proceed with an attack. An autonomous adaptive cyber controller can perform a reconfiguration of the network automatically and without human intervention.

Adaptive cyber controllers can be used to add a layer of security to critical infrastructure systems (also referred to as operational technology (OT) systems) and demonstrate that OT systems can be secured using adaptive systems that are proactive, flexible, and dynamic in response to cyber threats/events. For example, an adaptive cyber controller can implement adaptive/dynamic defense concepts that deceive, confuse, or misinform adversaries. Such concepts include, but are not limited to, changes to the network, perimeters, segments, names, addresses, visible defense layers, and pathways. Specific cyber security sensors can be used to trigger the proposed dynamic defense or enable a manual trigger. The approach may increase security, reliability, robustness, and resilience of systems (e.g., power/water/oil/gas distribution systems, military components, and buildings) and their associated processes. The technology described herein describes risk management of adaptive autonomous cyber controllers.

The methodology described herein can potentially risk-inform the decisions of an unsupervised, adaptive cyber controller, while aligning with other principles of a controller (e.g., an operating plan, business functions, and situational awareness). As one example of the methodology, a cyber controller can detect attack patterns, interface with a risk management module (also referred to as a risk module) to obtain risk-benefit alternatives, and can take an informed action to potentially prevent the progression of an attack and/or reduce or minimize business disruption. The risk methodology can support adaptive controllers through an on-demand module (e.g., the risk module) capable of developing actionable risk estimates associated with multiple network and/or system reconfiguration alternatives. For example, if an attacker attempts to push malware over a closed network socket, a security control—in this case a firewall—can prevent the malware from entering an electrical substation and the attack is unsuccessful. However, an attacker may use an open socket (e.g., port 80 for HTTP) to deliver malware. In that case, the first step of the attack may be successful; however, the subsequent security controls can be reconfigured so that the controller prevents or reduces an impact of the attack so that business losses are reduced or eliminated.

The approach can include a preliminary survey of controller architectures to provide the basis for understanding the characteristics of typical input and output of different architectures. A risk assessment can be performed to determine the expected impact on operational functions from the cyber network reconfiguration alternatives. The risk assessment can also determine the expected impact to the operational function of the infrastructure of taking no adaptive action. Metrics can be defined such that the trade-offs of interest are fully characterized. During a real-time operation, sensor information and output from the controller can be used to update a model for developing risk insights. This approach can enable closed-loop real-time operation of controller-risk communication with feedback for a truly adaptive control of critical and/or non-critical cyber infrastructure.

Autonomous systems can enable operations in hazardous environments and these systems can either be manned or unmanned. Examples of manned autonomous systems can include offshore systems, ships, and underwater vehicles. Emerging risks associated with autonomous marine systems can be categorized. Cybersecurity can be an element of such autonomous systems. For example, cybersecurity attacks on global positioning systems in the context of maritime navigation can be considered. Autonomous mechatronics systems with feedback loops may be vulnerable to cyberattacks that threaten system stability, controllability and observability. The problem can potentially be compounded by the use of instrumentation and control system components that can be either proprietary or commercial off-the-shelf, such as when analyzing cybersecurity assurance of nuclear power plant systems. The deployment of cyber enabled devices can expand beyond safety critical systems. For example, pervasive use of Internet of Things for deployment in smart city applications for intrusion detection can also be vulnerable to cybersecurity issues.

Cyber controllers can detect intrusions, identify attack patterns, and predict attack paths. In the adaptive sense, cyber controllers can reconfigure the system so as to challenge the adversaries with dynamic attack surfaces. Such advanced technologies can be referred to as 'Active Cyber Defense (ACD)' and can provide a scientific foundation as a basis for defending adversarial environments. An ACD framework can perform integrated analysis and decision-making. For example, a tradeoff analysis can be performed using an example of rebooting a secure server in anticipation of an integrity attack.

Autonomous controllers can be described as entities that tie variables in the physical space with decisions in the cyber-space and, in turn, affect the physical space. Physical variables can be quantified using distributed sensors installed across a complex cyber-physical system. One potential challenge towards autonomous decision-making is the ability to understand a system's global behavior given the known interactions between distributed control systems.

A risk-management framework using probabilistic risk assessment (PRA) methodology can be used to quantify risks to an OT system, such as a water supply supervisory control and data acquisition (SCADA) system. Event trees can be developed to enumerate business consequences with intrusions and internal threats as initiators. For example, a representation of a SCADA system can be used with input and outputs illustrated between master terminal units and remote terminal units (RTUs). This framework can potentially improve cybersecurity planning practices, and has potential for applications in adaptive and autonomous settings.

Fault trees can be used to analyze cyber-physical systems. Software fault trees analysis (SFTA) can be used in an operational setting targeting a systems reliability and safety and in an operational security setting. Deductive (e.g., fault trees) and inductive (e.g., event trees) methods can be part of a PRA toolset for cybersecurity assessment of SCADA and distributed control systems (DCSs). One challenge can be quantifying PRA risk metrics that use probability and frequency metrics. The PRA toolset can include identifying failure scenarios, their likelihood, and their consequences. While a PRA exercise yields solution alternatives and trade-off analysis in support of informed decision-making, risk management can include an assessment for treatment and control of identified risks. A completeness uncertainty can be associated with PRA techniques (e.g., fault trees and event trees), especially in large and complex infrastructure settings. PRA techniques can be reviewed and improved as a threat landscape evolves over time. Fault tree techniques can include using Boolean gates for an analysis in a static setting. Dynamic fault trees can be part of a dynamic PRA extended fault tree technique with notions of time dependence and phased missions by augmenting some of the constructs and Boolean gates. One potential challenge can include assigning probabilities to events for which no history exists, but insights into vulnerabilities unknown earlier can be produced when combined with expert elicitation.

As one example, a cyber-physical system can include multiple physical and computer systems that are interconnected by a computer network. The computer network can be monitored and controlled by a cyber controller. The PRA analysis can be performed by a risk module that is in communication with the cyber controller. For example, the risk module can receive attack data from the cyber controller and determine that a potential cyber-attack is underway using the received attack data and an attack graph. The attack graph can include nodes corresponding to elements of an attack surface of the network. The attack graph can link the elements of the attack surface to business functions that are represented using fault trees. Risk scores can be determined using the attack graph outputs as inputs to the fault trees. The respective risk scores generated by the fault trees can be used as inputs to an event tree that traces actions and potential actions to potential consequences of the business. The event tree and the determined risk scores can be used to determine risk estimates for different configurations of the network. For example, the risk estimates can quantify the potential consequences of doing nothing, making a first change to the network, making a second change to the network, and so forth, during a cyberattack. The risk estimates for the different configurations of the network can be sent to the cyber controller, so that the cyber controller can control the network based on the risk estimates. For example, the cyber controller can reconfigure the network in order to change the attack surface and potentially reduce an impact from or stop a cyberattack.

Accordingly, an adaptive, autonomous cyber controller can be combined with PRA techniques. The technology described herein may address gaps in the use of PRA methodology for operation of real-time autonomous missions using adaptive techniques for cybersecurity. For example, PRA can be used in dynamic and autonomous environments for real-time operational purposes in addition to planning studies as evidenced in safety critical industries. The technology can be applied to autonomous business systems (e.g., advanced nuclear reactors, substation automation, cyber-manufacturing, marine exploration and cloud-based SCADA systems). These types of systems can potentially benefit from strategies for facing cybersecurity challenges.

Example Architectures of Risk-Informed Cyber Controllers

FIG. 1 is a system diagram of an example of cyber-physical system 100 including a cyber controller 174 and a risk module 176. For example, the system 100 can be a supervisory control and data acquisition (SCADA) system, such as a power system including a synchrophasor system having components in a physical domain and in a cyber domain. The system 100 can be geographically distributed, including one or more remote sub-stations 120 in communication with a control center 170. The remote sub-stations 120 can be electrical sub-stations of an electrical generation and transmission system, cellular base-stations in a telecommunications network, medical equipment and systems in a hospital, and so forth.

The system 100 can include communication connections (e.g., network 160 and dedicated control path 180) to create a SCADA network to enable the implementation of a closed-loop control system between multiple, geographically dispersed remote stations 120 and a control center 170 connected to one another using technologies such as fiber optics, microwave, Ethernet, and/or twisted-pair connections. The remote sub-stations 120 can include measurement devices and/or sensors 140 for measuring properties of the systems within the remote sub-stations 120. Measurement signals originating from remote stations 120 can be relayed to the control center 170 by network devices 162 using a communications protocol, such as Internet Protocol (IP) based communication protocols (e.g., Distributed Network Protocol (DNP)). Similarly, control commands determined by processing these measurements can be sent back from the control center 170 to the remote stations 120 for execution, such as by the control logic 122. For some applications (e.g., fault protection), the different remote stations 120 can directly communicate with each other.

The interconnection network 160 can be utilized to interconnect various electrical components of the system 100 and the control center 170. The interconnection network 160 can include one or more network devices 162, such as switches, routers, and so forth. The interconnection network 160 can include plain old telephone service (POTS) signal lines, a local-area network (LAN), a wide-area network (WAN), and/or the Internet, for example. As a specific example, the interconnection network 160 can include multiple tiers of network infrastructure using routers and firewalls with site-to-site encryption, but local networks are unencrypted. It should be appreciated by one of ordinary skill in the art having the benefit of the present disclosure, that the network topology illustrated for the network 160 has been simplified and that many more networks and networking devices can be utilized to interconnect the various electrical components of the system 100. As illustrated, the network 160 is external to the remote sub-station 120 and the control center 170. However, the network 160 can include network devices that are integrated within the remote sub-station 120 and the control center 170. The cyber controller 174 can communicate with the network devices 162 to configure and/or reconfigure the network devices 162 to potentially improve cybersecurity of the system 100.

The remote stations 120 and the control center 170 can be protected by firewalls 150 and 172, respectively. A firewall is computer hardware, software, or a combination of computer hardware and software that separates and connects a more-trusted portion of a network from a less-trusted portion of the network. Firewalls can filter (e.g., selectively discard) communications packets based on network protocol information, among other things. The firewalls 150 and 172 can include software, a processor, a microcontroller, programmable logic (e.g., a field-programmable gate array (FPGA)), hardwired finite state machines, programmable microcode, or other suitable control circuits for filtering communications packets. As one example, a firewall can be configured with a table of network addresses that can be forwarded or blocked by the firewall. As another example, a firewall can be configured to block different port numbers associated with an IP packet. The cyber controller 174 can communicate with the firewalls 172 and 150 and configure and/or reconfigure the firewalls to potentially improve cybersecurity of the system 100 by changing an attack surface of the system 100. For example, the cyber controller 174 can program the firewalls 172 and 150 to enable or block particular network addresses, to open or close communication ports, and so forth.

The sensors 140 can be used to perform real-time measurements of physical properties of systems of the remote substation 120. As a specific example, the remote substation 120 can be an electrical substation that is part of an electrical generation and transmission system. Inputs and/or outputs of the electrical components within the sub-station 120 can be measured by the sensor 140, such as a phasor measurement unit (PMU). A PMU is a device that can be used to measure or estimate a magnitude and/or phase angle of an electrical quantity such as voltage or current using a common time source for synchronization. By using a common time source, the measurements of a given component can be synchronized for the component and across different components. Thus, a synchronized measurement of the system 100 can be taken across all of the components of the system 100. One method for synchronizing the measurements is by using a Global Positioning System (GPS) reference source. For example, a GPS satellite 110 can transmit a time synchronization signal 115 which can be received by an antenna 130 connected to sensor 140 including a GPS receiver. The sensor 140 can communicate the synchronized measurement to the firewall 150 so that the measurement can be transmitted to the control center 170. As one example, the sensor 140 can generate a timestamp based on the GPS reference signal, and the timestamp can be combined with the measurement of the electrical quantity to generate synchrophasor data. The sensor 140 can capture samples of the electrical quantities at a rate of 30, 60, or 90 samples per second, for example. Thus, the input and/or output waveforms can be reconstructed from the measurement with relatively high accuracy.

The sensor 140 can include hardware, software, or a combination of hardware and software. For example, the sensor 140 can include a processor, a microcontroller, programmable logic (e.g., a field-programmable gate array), hardwired finite state machines, programmable microcode, or other suitable control circuits for measuring an electrical quantity, synchronizing the measurement with a reference time source, and communicating with one or more devices of the synchrophasor system. The sensor 140 can include circuits for measuring an electrical quantity, such as current, voltage, and/or phase angle. The sensor 140 can include circuits for communicating over an interconnection network, such as the interconnection network 160. In one example, the sensor 140 can include a GPS receiver.

The control center 170 can include a firewall 172, a cyber controller 174, a risk module 176, and additional computer systems 178 (such as a phasor data concentrator (PDC), human resources, operational, monitoring, and maintenance computer systems, and so forth). The firewall 172, the cyber controller 174, the risk module 176, and the additional computer systems 178 can communicate with each other over direct connections, a local unencrypted network, or an encrypted network, for example. A PDC can collect and synchronize synchrophasor data and other information from the various electrical components of the system 100, correlate the data from the various electrical components, and pass the correlated data to monitoring and/or control logic. The monitoring and/or control logic can be executed on a processor (not shown) that can generate control signals that control equipment and systems of the remote sub-stations 120. The control signals can be communicated to the remote sub-stations 120 via the network 160 or via a dedicated control path 180. For example, the control signals can be received by the control logic 122 and used to change operating parameters of the components within the remote sub-stations 120. Human resources computer systems and databases can track information about employees such as working schedules, account privileges, passwords, and so forth. Maintenance computer systems can track when machines and other systems are due for or are offline for maintenance.

A cyber attacker can attack the system 100 at various points of attack depending on skills and goals of the cyber attacker and/or vulnerabilities of the system 100. The various points of attack of the system 100 can be referred to as an attack surface of the system 100. The attack surface can include network, software, hardware, and/or human vulnerabilities. For example, the attack surface can include various services available within the control center 170 (such as those executing on the additional computer systems 178), ports accessible over the firewalls 172 and 150, data being communicated between the remote substations 120 and the control center 170, the network devices 162, timing signals (such as the GPS signal 115), computer code communicating with the accessible ports, computer code that processes electronic mail and other files, user and administrative accounts for users of the control center, employees with access to the control center, and so forth. As a specific example, one potential target for a cyber-attack of the system 100 is the synchronized timing information that is embedded with the synchrophasor data. A cyber-attacker could potentially exploit vulnerabilities within the system 100 to delete and/or modify the timing information so that the synchrophasor data reports no or corrupt information. The missing and/or corrupt synchrophasor data could potentially cause monitoring and/or control logic to report erroneous problems with components of the remote sub-station 120 and/or to adjust control parameters of the components so that the components are damaged and/or taken out of service. A cyber-attack can attempt to modify the timing information at different points within the system 100. For example, an attacker can try to jam, spoof, or meacon the GPS signal 115. Meaconing includes intercepting and rebroadcasting a navigation signal (such as the GPS signal 115). When the GPS signal is rebroadcast, an attacker can modify the signal with incorrect timing information and rebroadcast the modified signal at the received frequency. By rebroadcasting the modified signal at a higher power than the original signal, the GPS receivers (e.g., the GPS receiver on sensor 140) of the components may use the information encoded within the modified signal instead of the information encoded within the original signal. Thus, incorrect timing information may be propagated along with the synchrophasor data. Alternatively or additionally, an attacker can attempt to strip out or modify the timing information as it passes through the network 160 or the firewalls 150 and 172. It should be appreciated by one of ordinary skill in the art having the benefit of the present disclosure, that a timing attack is one form of cyberattack, and other forms of cyberattack are also possible.

The cyber controller 174 and/or the risk module 176 can be used to monitor and/or control elements of the attack surface of the system 100. For example, the attack surface can include the data (e.g., the GPS signal 115), services, and users of the system 100. The attack surface can include the hardware and software components of the satellite 110, the sensors 140, the control logic 122, the firewall 150, the network devices 162, the firewall 172, the additional computer systems 178, and the dedicated communication path 180. The cyber controller 174 can monitor the attack surfaces of the system 100. The cyber controller 174 can directly control (e.g., reconfigure) elements of the system 100, such as the firewalls 150 and 172, the control logic 122 and/or the additional computer systems 178. For example, the cyber controller 174 can configure these elements by causing configuration data to be loaded onto one or more of the elements to change or reconfigure the respective elements. The risk module 176 can perform a PRA analysis using different analysis tools, such as attack graphs, fault trees, and event trees. Attack graphs are described in more detail below with reference to FIG. 11; fault trees are described in more detail below with reference to FIGS. 6-10; and event trees are described in more detail below with reference to FIGS. 4-5.

The risk module 176 can receive attack data from the cyber controller 174 and, using the received attack data and an attack graph, determine that a potential cyber-attack is underway. The attack data can represent the likelihood or probability that the different components of the system 100 are under cyberattack. The attack data can be binary indicating that each of the components is or probably is under attack or that each of the components is not or probably is not under attack. Alternatively, the attack data can be analog indicating a percentage chance that each of the components is under attack. The attack graph can map the attack data to components of the system. Specifically, the attack graph can identify a causal linkage of events and/or equipment for a particular cyberattack. The output(s) from the attack graph can represent probabilities that equipment in the causal chain has been compromised during the cyberattack. In other words, an attack probability can include, but is not limited to, a calculated probability that a respective element of an attack surface of the network is or will be attacked. The attack graph can link the elements of the attack surface to business functions.

The business functions can be represented using fault trees. The fault trees can be used to determine risk scores when the attack graph outputs are used as inputs to the fault trees. The risk scores can represent a likelihood or probability that a business function is compromised during a cyberattack. As one example, the business functions can be based on the Purdue Enterprise Reference Architecture (PERA) with five levels of business coordination, where each level of business coordination is represented by a different respective fault tree. Level 4 business coordination can represent an enterprise system responsible for order processing and overall job scheduling. Level 3 can represent business operations, and concerns detailed scheduling and production control. Level 2 can represent SCADA/DCS and can represent a supervisory control center with basic production commands emanating from Level 1-hosted RTUs and programmable logic controllers (PLC). End devices in the field at Level 1 can form a bridge between RTUs/PLCs and process machinery at Level 0. Cyberattacks can happen at any level and can cascade through levels. As described herein, cyber elements and the business processes can be mapped through this reference architecture to formulate risk-informed adaptive configurations based on situational awareness. For example, the probabilities of components being compromised can be determined by the attack tree and propagated through the business functions using fault trees to produce risk scores for the business functions. The respective risk scores generated by the fault trees can be used as inputs to an event tree.

The event tree can trace actions and potential actions to potential consequences of the business. The event tree and the determined risk scores can be used to determine risk estimates for different configurations of the network. The risk estimates for the different configurations of the system 100 can be sent to the cyber controller 174, so that the cyber controller 174 can select between the different configurations, and control the system 100 based on the risk estimates.

As a specific example, the system 100 can be adapted by changing an operating parameter of a component of the system 100 based on the risk estimates. Changing the operating parameter of the component of the system 100 can include removing the component from the system 100. As another example, changing the operating parameter of the component of the system 100 can include selecting an alternative timing source. In this manner, the cyber controller 174 can be used to adapt the system 100 in response to detecting a potential cyber-attack to potentially improve the cybersecurity of the system 100.

As illustrated, the risk module 176 can be separate from the cyber controller 174, but in other examples the risk module 176 can be integrated within the cyber controller 174. The cyber controller 174 and the risk module 176 can be computer hardware, software, or a combination of computer hardware and software. The cyber controller 174 and the risk module 176 can include software, a processor, a microcontroller, programmable logic (e.g., a field-programmable gate array), hardwired finite state machines, programmable microcode, or other suitable control circuits.

The implementation of a risk module can include many features from the cybersecurity realm. An example is the use of artificial intelligence to correlate cyber activity patterns with attack graphs and in predicting the potential attack path with a degree of confidence. Security information and event management (SIEM) software can address problems associated with correlation and detection probabilities. Event and fault trees can be customized to account for variability within one or more domains. Other frameworks can aid in identifying failure propagation paths and delineating nominal from abnormal system behavior. An example of such a framework is Function-Failure Identification and Propagation (FFIP). The developed trees herein can be further customized for a variety of enterprise control systems; business specific process equipment data and configuration information can be mapped to the event tree. Fault and event tree structures can persist in an ASCII-text file format. Data associated with events (e.g., likelihood and vulnerabilities) can be stored in a database. The file format for structures and data together can be collectively called Models and Results Database (MAR-D). PRA software, such as CAFTA, can be used for the development of trees. Other tools can also be used.

The risk module can use attack graphs or similar graph structures (e.g., Petri nets, Bayes nets, and Markov models) outside the module that can provide situational awareness information on demand and/or at the trigger of an event. Note that such structures can have different file formats. The execution of a cyber controller in an operational mode can use information on observed attack path and predictive possible paths with a certain degree of confidence. The former may either be a confirmed fact, the result of a machine-learned analysis, or a combination of both. The latter can be derived from the trees and narrowed down with additional situational awareness information. Asset vulnerability information can be obtained through mapping enterprise assets against a publicly available vulnerability database supported by a normalized scoring system or through an incident management system. Where such information is unreliable or unavailable, a binary notion of whether an attack is underway can be used and deterministic attack paths can be traced from the event tree. There can be undiscovered vulnerabilities (zero-day) that can be supplemented with active monitoring and advanced sniffing procedures.

The control center (Level 2) has greater situational awareness than any individual remote station (Level 1). A coordinated attack on multiple stations can result in counterintuitive security control adaptations for any single station. Therefore, the risk modules deployed to each station can communicate with the cyber controller and allow precautionary security control adaptations if an intrusion is detected. This can potentially limit the effectiveness of a cyberattack.

The implementation can be based on an observe, orient, decide, and act loop theory. The cyber controller observes an intrusion, orients itself using the risk-informed methodology, and acts to implement a security control within the bounds of a unified operating plan if running in autonomous mode or makes a recommendation for a human in the loop to consider.

Figure 2:
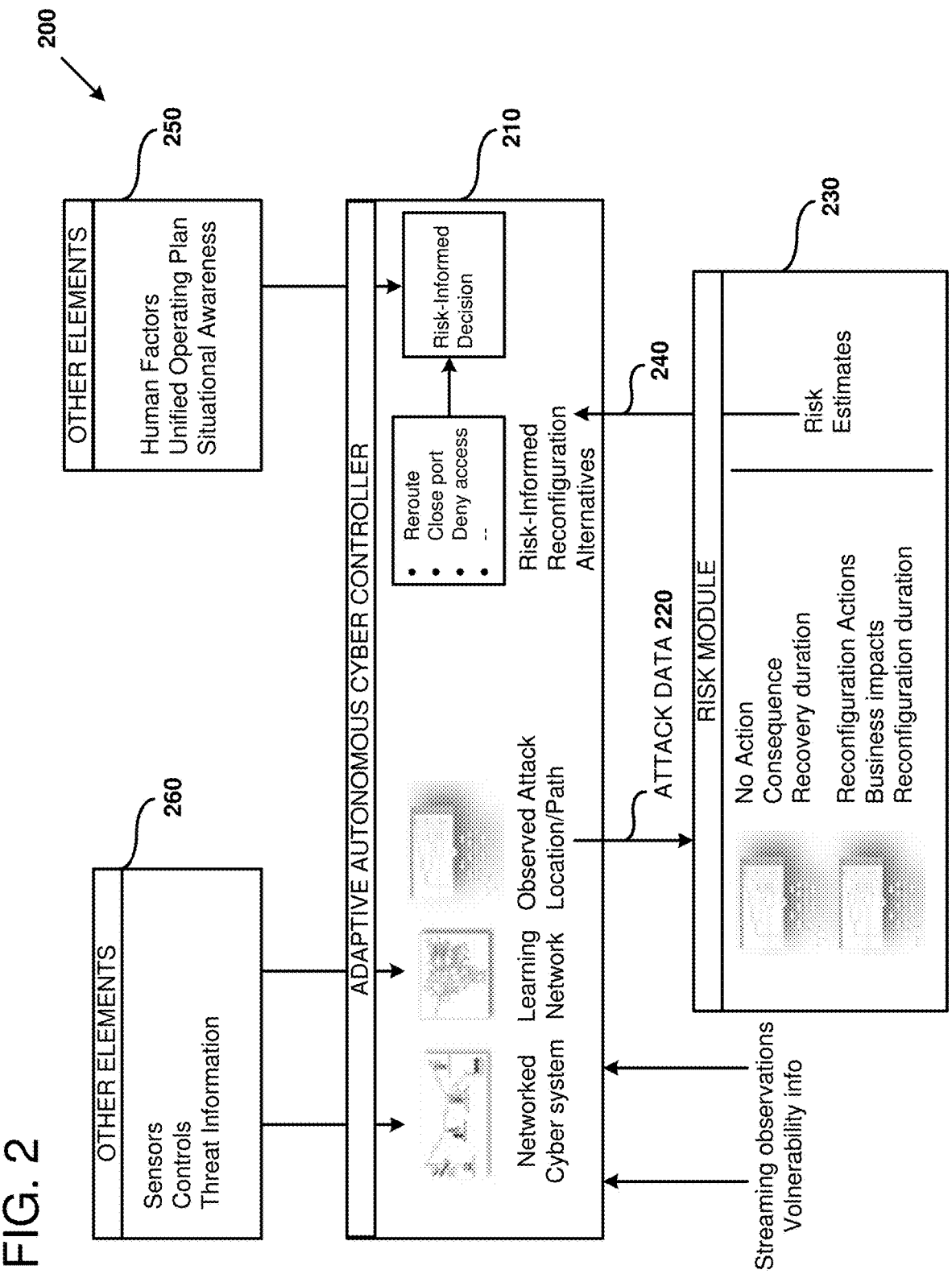
FIG. 2 illustrates an example framework for a risk-informed autonomous adaptive controller, as can be implemented in certain examples of the disclosed technology.

FIG. 2 illustrates an example framework 200 for a risk-informed autonomous adaptive controller 210. Cyber controllers can be business-aware, especially when their intended design is autonomous decision-making. The cyber controller 210 can pass an observed attack path (e.g., attack data 220) to a risk module 230 where risk estimates 240 are generated for (1) no action and (2) a set of reconfiguration alternatives to confuse an attacker. The former is associated with business loss consequences of not preventing an attack while the latter is associated with potential risks to the business due to making dynamic configuration changes. The cyber controller 210 can choose to be adaptive at a later time depending on inputs from situational awareness and continuous learning modules 250. The cyber controller 210 can use outputs from the risk module 230 and other elements 260 to finalize a decisive action. Human factors can be included as inputs in the framework 200 to enable operator involvement to allow the systems to operate in either an autonomous or a supervised manner.

A systematic risk assessment, using the cyber controller 210 and the risk module 230, can connect observations, potential attack pathways, reconfiguration alternatives, and business impacts. One output of this mapping process can be quantified risk metric(s) (e.g., risk estimates 230) to support a trade-off analysis among the alternatives as part of decision-making. The cause-consequence analysis can produce a metric representative of confidence in the observations, vulnerabilities in the predictive mode, likelihood of an adversary taking a predictive path, and consequences associated with the reconfiguration. The methodology hosted in the risk module 230 for the risk assessment described above is described in more detail below with reference to the following figures.

Figure 3:
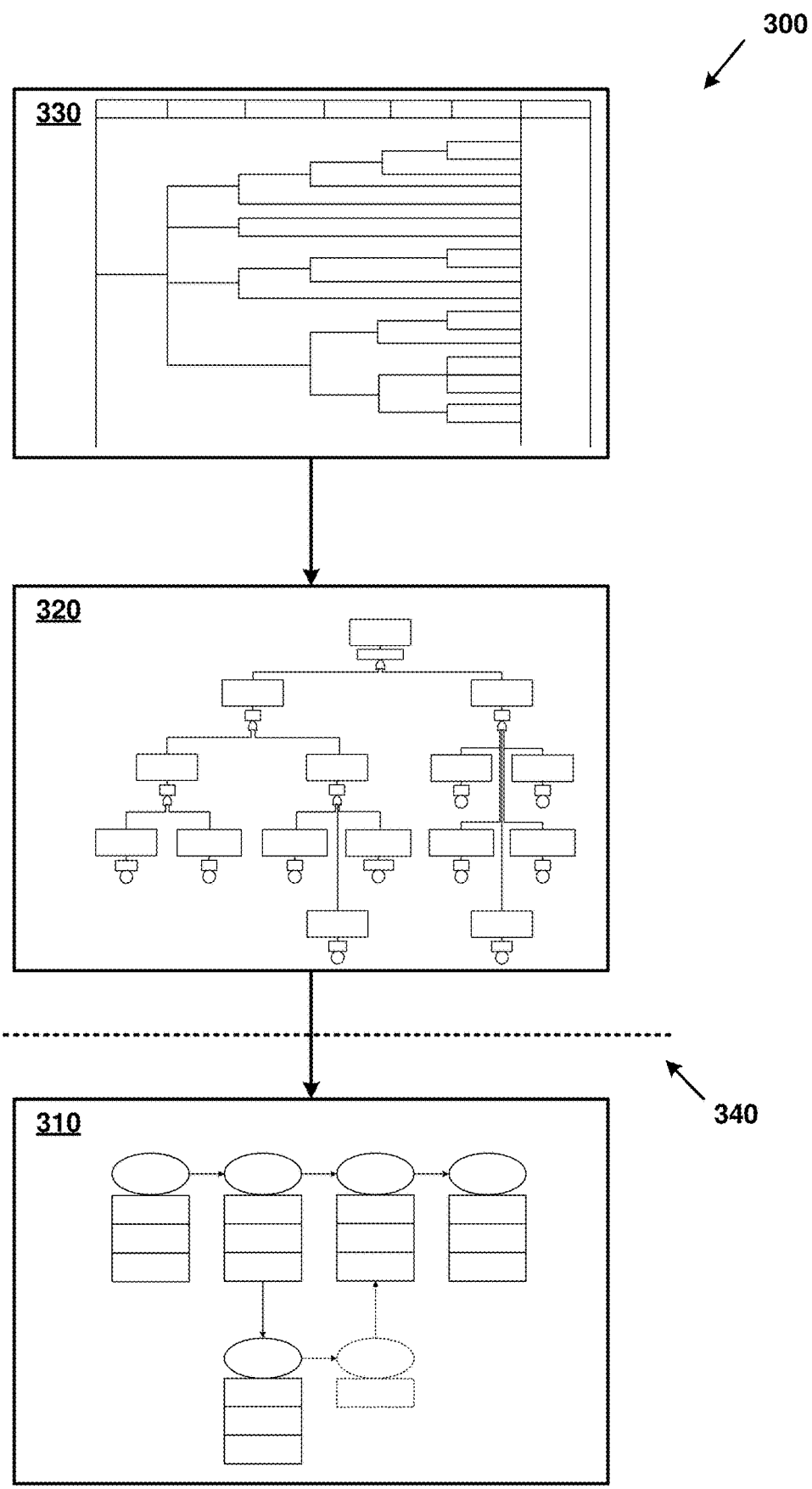
FIG. 3 illustrates an example methodology to trace cyber-attacks through a control system, as can be implemented in certain examples of the disclosed technology.

FIG. 3 illustrates an example methodology 300 to trace cyberattacks through a control system (such as the system 100 of FIG. 1). The methodology 300 can use a combination of attack graphs (e.g. attack graph 310), fault trees (e.g. fault tree 320), and an event tree 330 to perform a risk evaluation. Attack graphs can identify a failure of specific cyber elements and provide linkages to fault trees to identify business function impacts. The fault trees, in turn, can identify nodes on the event tree 330 to trace a progression of an attack through the overall business. The event tree 330 can capture the five levels of enterprise control systems described earlier. The fault tree can expand upon and add detail to each of those levels. Attack graphs can reference fault and event tree nodes to show entry points into the business. These three different structures can delineate business flow from specifics of individual functions and cyber elements. Additionally, event and fault trees can be relatively static compared to attack graphs given the dynamism of new threats and the introduction of new information technology (IT) systems for business expansion. Event and fault trees can capture broad categories of business functions and IT systems while the attack graphs can capture the specific IT equipment used for smooth business operation. The analysis of the attack graphs and the event and fault trees can be separated among different controllers, software modules, and/or services. As one example, the attack graphs can be implemented outside of a risk module boundary 340 (such as within the cyber controller 210 of FIG. 2), while the event and fault trees are implemented within the risk module (such as within the risk module 230 of FIG. 2). As another example, all of the graphs can be implemented inside of the risk module boundary.

Event tree analysis (ETA) is a PRA technique that can be used in the nuclear, chemical, and aerospace industries to formulate accident scenarios. Each scenario can be mapped between an initiating event (e.g., intrusion), vulnerabilities (e.g., levels of an enterprise-control system), detection systems, and end-state consequences (e.g., loss consequence). The intermediate events in the event tree can be mitigation system actions in response to an initiating event in safety critical industries (e.g. nuclear).

Figure 4:
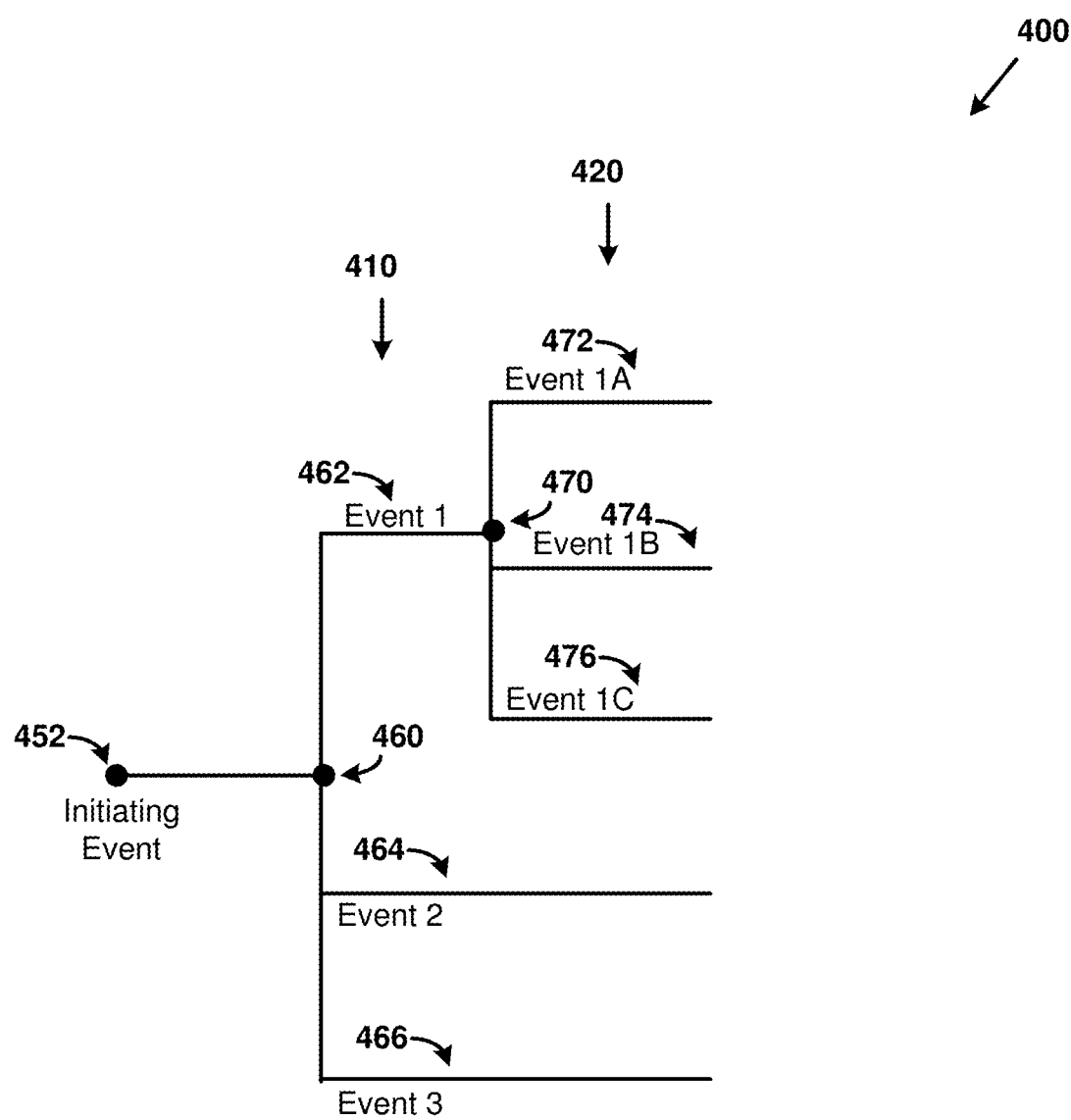
FIG. 4 illustrates an example of an event tree that can be used to model events of a system, as can be implemented in certain examples of the disclosed technology.

FIG. 4 illustrates an example event tree 400 that can be used to model events and/or potential outcomes within an electrical system or other type of system (such as the system 100 of FIG. 1). An event tree is a data structure that represents a set of consequences that can occur based on a set of possible events for a given system or sub-system. An event tree is an analytical tool that enables an event to be modelled or analyzed using Boolean or other logic to examine a group of possible events and/or consequences of the events. For example, the event tree can identify a chronological series of subsequent events, a group of actions to take in response to the events, and/or consequences that result from the events. As one example, an event tree can be implemented as a tree, a graph, or other suitable data structure that is stored in a computer-readable memory or storage device. The event tree can be used to inductively trace forward in time or through a causal chain to model risk. Event tree analysis can be contrasted with fault tree analysis, where a fault tree can be used to evaluate risk by deductively tracing through a causal chain of events.

FIG. 4 illustrates an example event tree 400 that can be used to model potential outcomes that can occur within a multi-level system. A root 452 of the event tree can represent an initiating event of the system. The event tree can be organized by levels (410 and 420), such as the levels of business coordination represented by the Purdue Enterprise Reference Architecture (PERA). A node or branch-point (460 and 470) of the event tree can represent the interface between one level of the system and the next level of the system. A respective branch (also referred to as a sub-branch) originating from a given branch-point can represent an outcome (also referred to as a consequence) that can occur or a change (e.g., a reconfiguration) that can be made at the level represented by the branch-point. Sub-trees can include a group of connected branches and branch-points, and can represent a range of outcomes and/or reconfigurations that can be generated by the system. As a specific example, a system can be brought on-line as represented by the root 452. The branch-point 460 can indicate that the system has different aspects and/or configurations. The sub-branches 462, 464, and 466 can represent the different possible aspects and/or configurations and outcomes that can be associated with these aspects and/or configurations (e.g., event 1, event 2, and event 3). If event 1 occurs or is configured, additional events 472, 474, and 476 are possible or can be configured as represented by the branch-point 470. As illustrated, if event 2 or event 3 occur or are configured, the outcomes are not changed at the level 420. The event tree 450 can represent five different possible outcomes (events 1A, 1B, 1C, 2, and 3) of the system. As described herein, fault trees can be used in conjunction with or as an input to the event tree. For example, a fault tree can determine a probability of one or more events occurring. A risk estimate can be determined by multiplying a value of a consequence by the probability of the consequence occurring.

Figure 5:
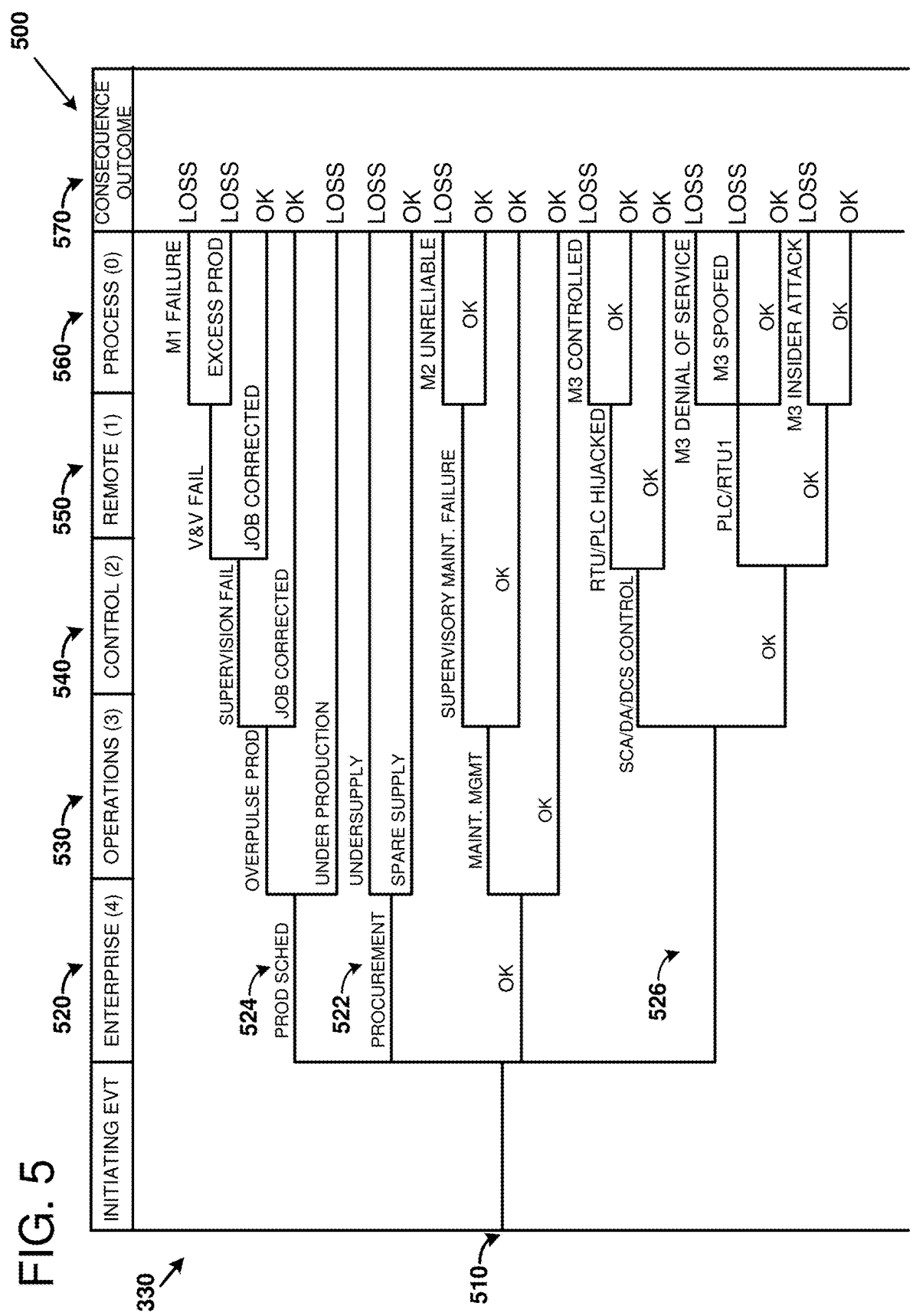
FIG. 5 illustrates an example event tree illustrating possible attack scenarios of an enterprise control system.

FIG. 5 is a diagram 500 illustrating an example event tree 310 illustrating possible attack scenarios of an enterprise control system. The event tree 330 can be used to trace high-level business processes (also referred to as levels) of the enterprise control system, the compromise of which could lead to cascading and undesirable consequences. The initiating event 510 can be an intrusion, which may occur at any step in the business process despite its placeholder representation at the very beginning of the tree.

One line of defense if the intrusion happens at the enterprise center can be a set of cybersecurity controls established at the center. A breach at the enterprise level 520 can open attack pathways to the operations level 530 and to the control level 540 by manipulating production planning (e.g., procurement 522), scheduling 524, and other IT systems 526. If not properly validated before execution of scheduled jobs, there can be a potential failure, trip, or inefficient running of equipment. Attacks on the operations level 530 can potentially jeopardize maintenance schedules leading to early failure of equipment or increase in the number of corrective actions. If attackers gain direct access to the control level 540 bypassing enterprise security, they may send harmful commands to the remote level 550, which can potentially damage or disable equipment at a remote substation. An intrusion can happen directly at the remote level 550 with the ability to takeover devices that control process 560 instrumentation. Identification and mapping of vulnerable devices that connect to process equipment can allow for consequence quantification at the system level. The consequences 570 can be quantified or valued based on the type of system be represented by the event tree. For example, the consequences 570 can be in units of Megawatt hours for an electrical generation and transmission system, in down-time for a high-reliability system, or in dollars for a variety of systems. As described above, a risk estimate can be determined by multiplying a value of a consequence by the probability of the consequence occurring. The probability of the consequence occurring can be generated by a fault tree, for example.

A fault tree is a data structure that represents a function and different ways that the function can fail. The output of a fault tree can be a probability of a failure of the function represented by the fault tree. As one example, a fault tree can be implemented as a tree, a graph, or other suitable data structure that is stored in a computer-readable memory or storage device. Fault tree analysis (FTA) can complement ETA by considering each level in the event tree as a top event and deductively analyzing failure causation. As one example, there can be at least as many fault trees as there are levels presented in the event tree. In other words, each level of the event tree can have at least one corresponding fault tree. While event trees can trace business in the forward direction, fault trees investigate deeper into each business function and can trace business functions causing the level failure. Specifically, a fault tree can identify failure mechanisms of the overall function and the sub-functions represented by the fault tree. The fault tree can identify relationships between the different sub-functions and their failure modes. For example, the overall function of the fault tree can be represented by a parent node (also referred to as a root node) of the fault tree. Sub-functions and their failure modes can be represented by sub-trees of the fault tree, where nodes of the sub-tree can be sub-functions and/or failure modes. Input nodes can represent an event (such as a failure of a component), and an input value to the input node can represent the probability of the event occurring. The relationships between the sub-functions (and their failure mechanisms) can be captured using Boolean gates, such as AND gates, OR gates, and priority AND gates. For example, probabilities of sub-functions failing can be combined using Boolean gates to determine whether the function represented by the parent node is failing. An AND gate can indicate that all inputs to the AND gate must fail in order for the combination to fail. The probability of a failure from an AND gate is the probability of the inputs multiplied together. An OR gate can indicate that at least one input to the OR gate must fail in order for the combination to fail. The probability of a failure from an OR gate is the probability of the inputs added together, with the probability of the union of the inputs subtracted from the sum. A priority AND gate can be used to represent a sequential order of events. The FTA and ETA analysis can be implemented in hardware, software, or a combination of hardware and software. Broad categories can be identified, and the specific failure mechanisms of sub-functions can be left to attack graphs.

Figure 6:
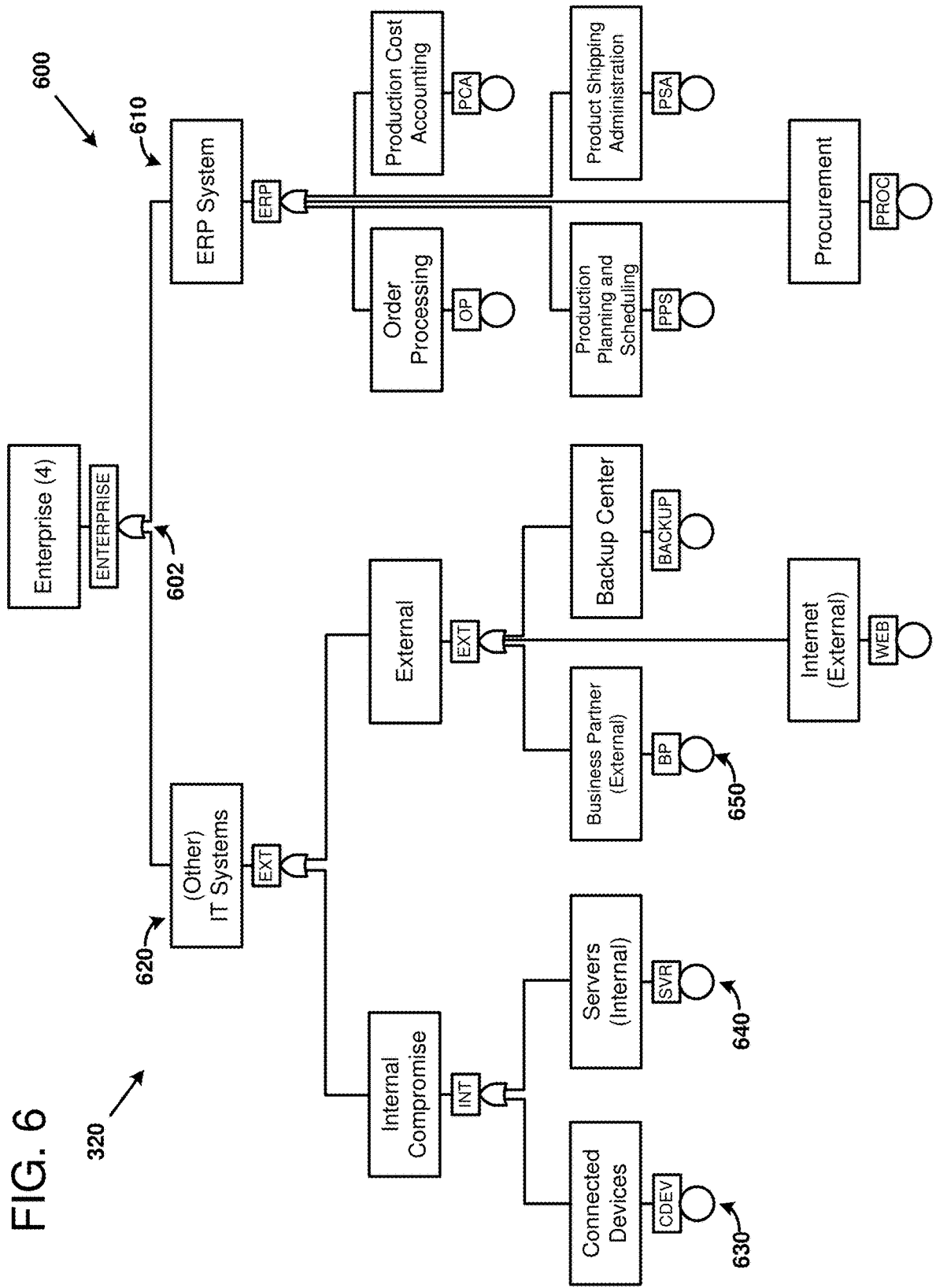
FIG. 6 illustrates an example fault tree representation for enterprise level failure, as can be implemented in certain examples of the disclosed technology.
Figure 7:
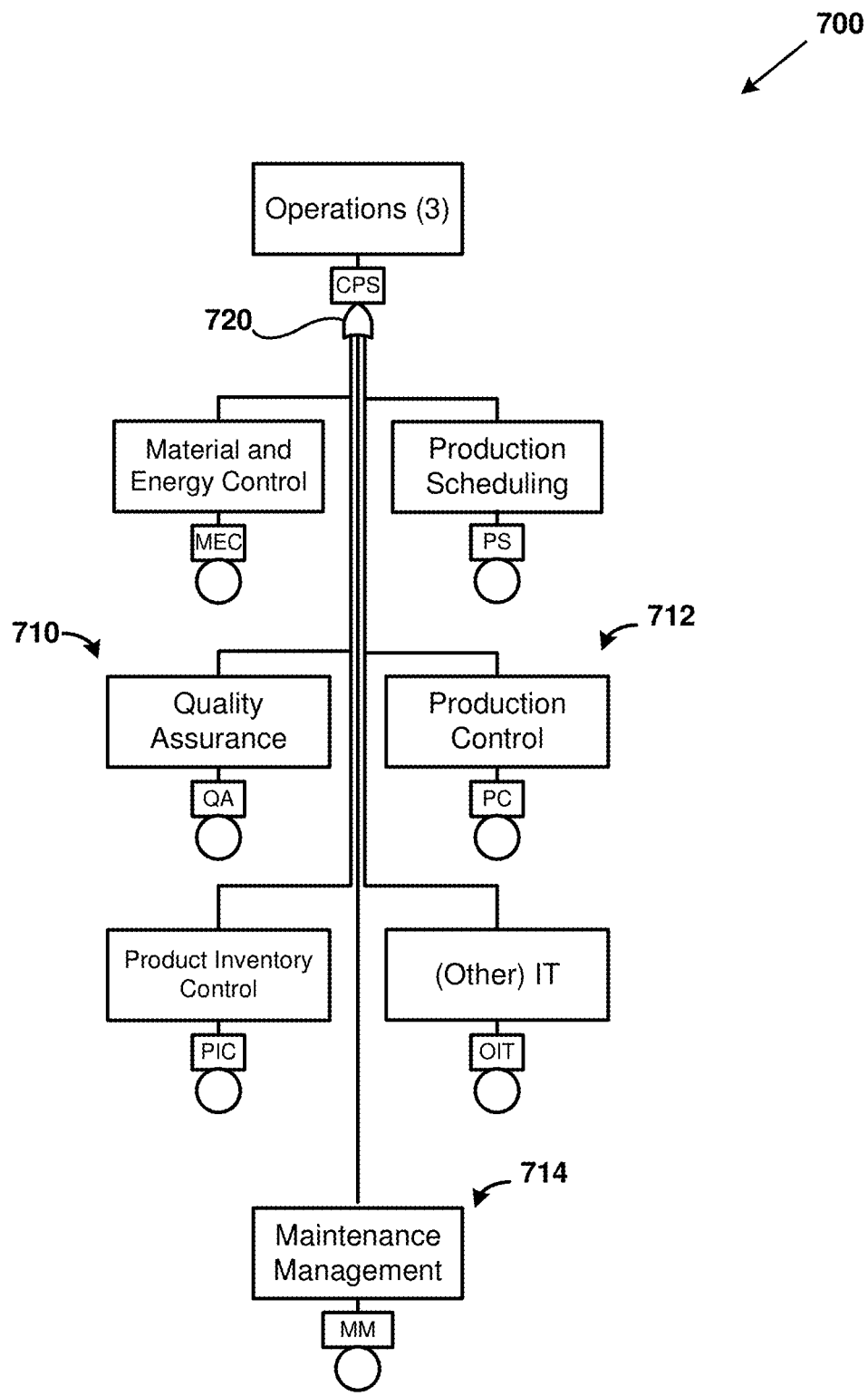
FIG. 7 illustrates an example fault tree representation for operations level failure, as can be implemented in certain examples of the disclosed technology.
Figure 8:
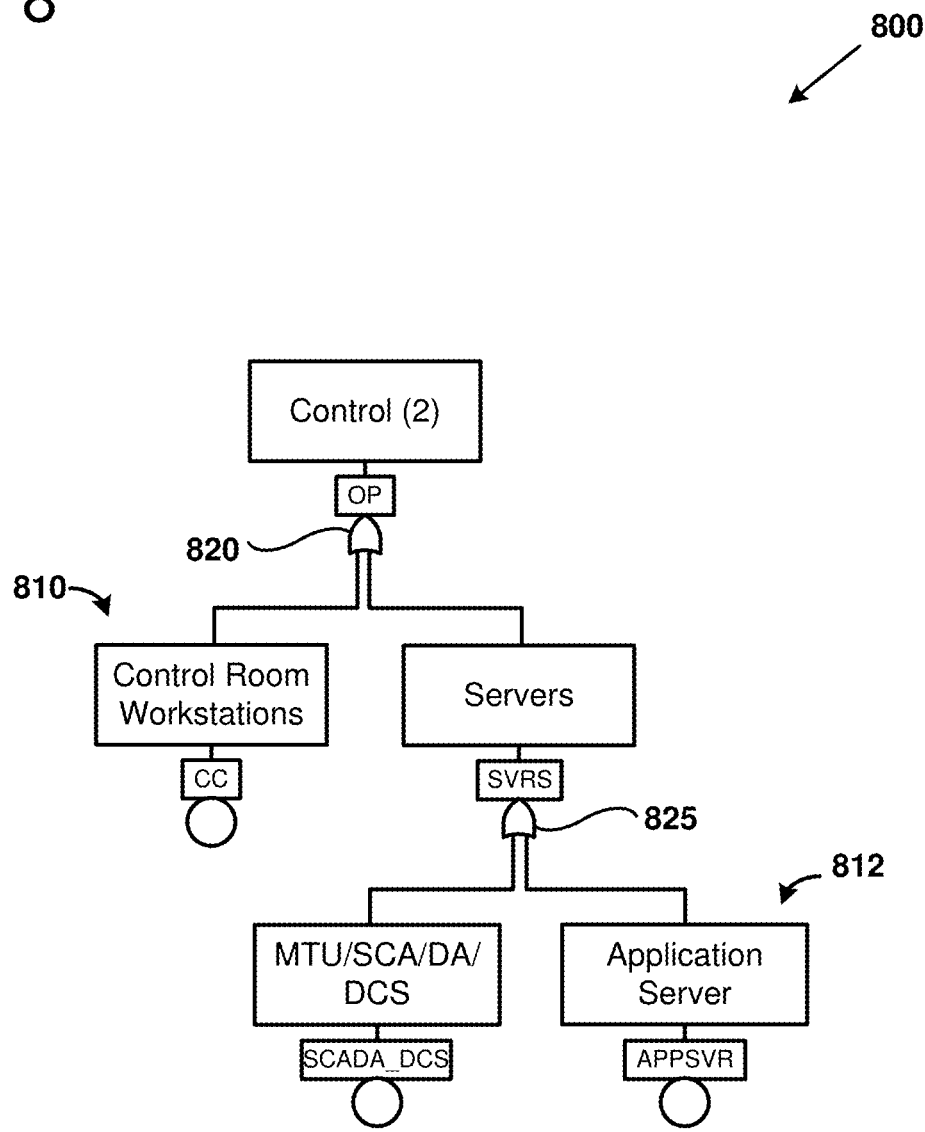
FIG. 8 illustrates an example fault tree representation for control center level failure, as can be implemented in certain examples of the disclosed technology.
Figure 9:
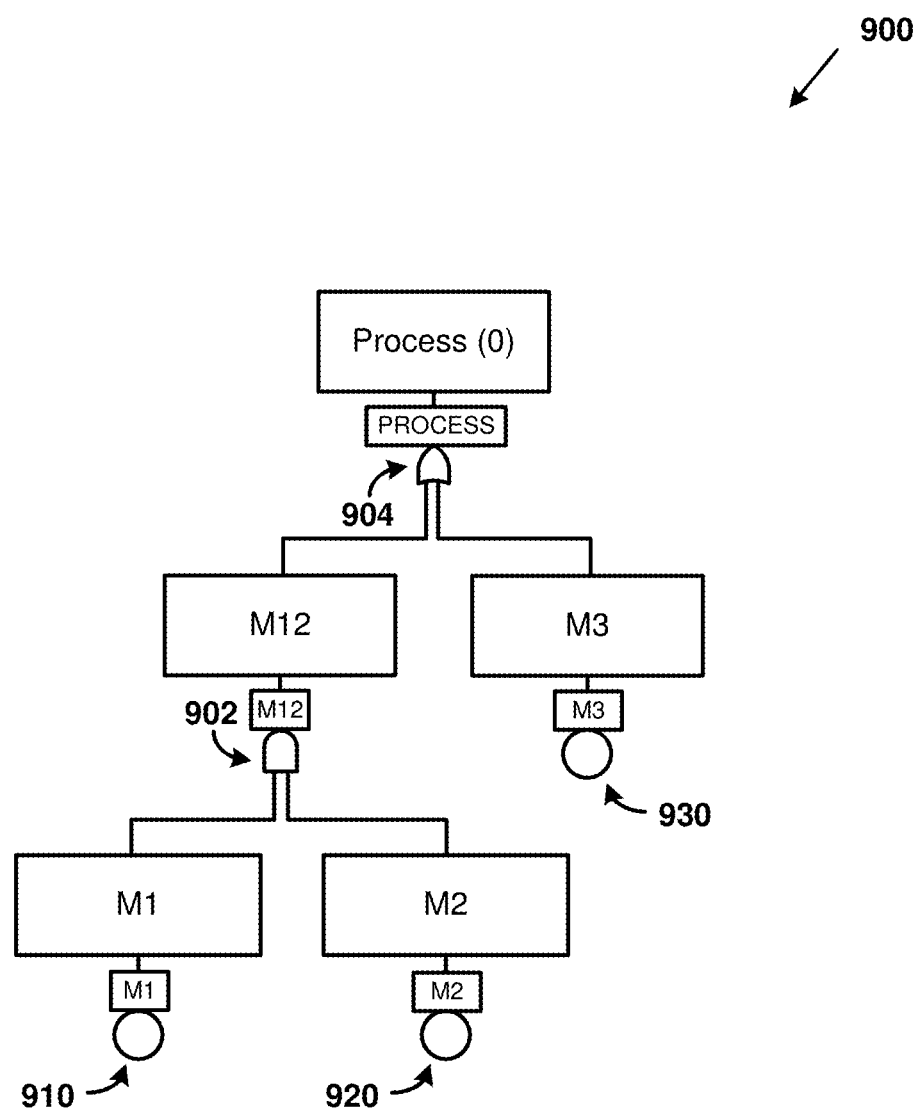
FIG. 9 illustrates an example fault tree representation for process level failure, as can be implemented in certain examples of the disclosed technology.
Figure 10:
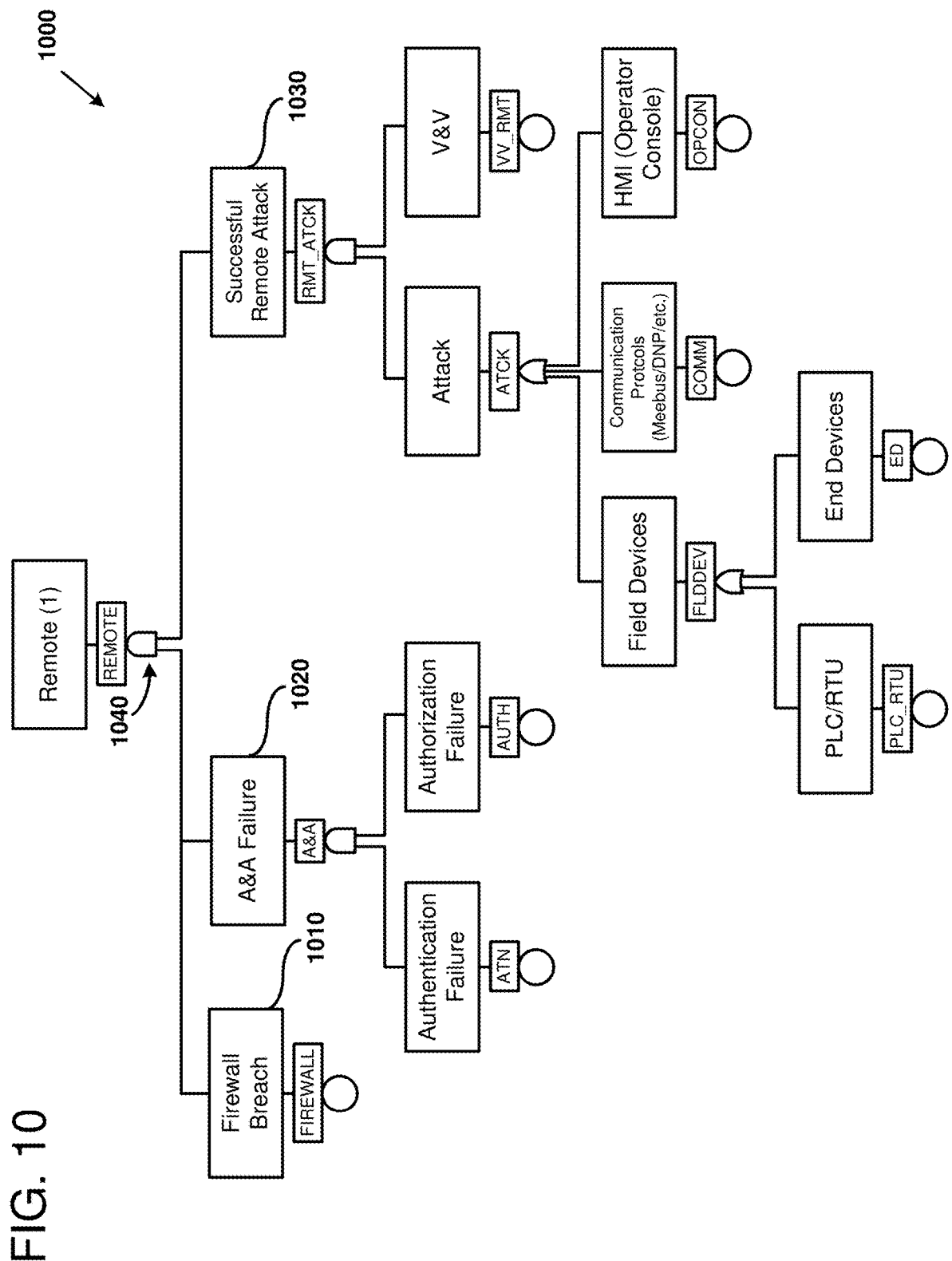
FIG. 10 illustrates an example fault tree representation for remote station level failure, as can be implemented in certain examples of the disclosed technology.

Examples of fault trees associated with each level (e.g., enterprise and operations) are illustrated in FIGS. 6-10. Specifically, FIG. 6 is a diagram 600 illustrating a fault tree representation for an enterprise level failure; FIG. 7 illustrates an example fault tree representation for an operations level failure; FIG. 8 illustrates an example fault tree representation for a control center level failure; FIG. 9 illustrates an example fault tree representation for a process level failure; and FIG. 10 illustrates an example fault tree representation for a remote station level failure.

FIG. 6 is a diagram 600 illustrating a fault tree representation 320 for an enterprise level failure. For example, enterprise cybersecurity may be compromised due to loss of enterprise resource planning (ERP) systems 610 or other IT systems 620. The relationship between the ERP systems 610 and the other IT systems 620 is specified by the AND gate 602, so that the probability of the enterprise level failing is the sum of the probabilities of the ERP systems 610 failing and the other IT systems 620 failing, minus the probability of the union of the ERP systems 610 failing and the other IT systems 620 failing. The output of the AND gate 602 can indicate the probability of an enterprise level failure. Inputs (e.g., node inputs 630 (for connected devices), 640 (for internal servers), and 650 (for external business partners)) to the fault tree can be generated by respective attack graphs. The attack graphs can generate a probability of a cyberattack occurring or being underway for a particular sub-system. The probabilities of attacks occurring on the different sub-systems can be used as inputs to the fault tree.

FIG. 7 is a diagram 700 illustrating an example fault tree representation for operations level failure, as can be implemented in certain examples of the disclosed technology. For example, enterprise cybersecurity may be compromised due to a failure at the operations level 530. The relationship between the operations level sub-systems is specified by the OR gate 720, so that the probability of the operations level failing is the sum of the probabilities of the operations level systems failing. The output of the OR gate 720 can indicate the probability of an operations level failure. Inputs (e.g., quality assurance input 710, production control input 712, or maintenance management input 714)) to the fault tree can be generated by respective attack graphs. The attack graphs can generate a probability of a cyberattack occurring or being underway for a particular sub-system. The probabilities of attacks occurring on the different sub-systems can be used as inputs to the fault tree.

FIG. 8 is a diagram 800 illustrating an example fault tree representation for control center level failure, as can be implemented in certain examples of the disclosed technology. For example, enterprise cybersecurity may be compromised due to a failure at the control center level 540. The relationship between the operations level sub-systems is specified by the OR gates 820 and 825, so that the probability of the operations level failing is the sum of the probabilities of the control server systems and control room workstations failing. The output of the OR gate 820 can indicate the probability of an control center failure. Inputs (e.g., control room workstations input 810 or application server input 812)) to the fault tree can be generated by respective attack graphs. The attack graphs can generate a probability of a cyberattack occurring or being underway for a particular sub-system. The probabilities of attacks occurring on the different sub-systems can be used as inputs to the fault tree.

FIG. 9 is a diagram 900 illustrating an example fault tree representation for a process level failure. A fault tree for level 0 (process) can be used for each business system identifying specific process equipment along with redundancies and parallel-series configuration allowing the tracing of business-related loss consequences. The fault tree 900 shows that complex relationships of different sub-functions can be represented by using different Boolean gates. As illustrated, the process fails either when mode three (M3) fails or both mode one (M1) and mode two (M2) fail. The probability of each of modes M1, M2, and M3 failing can be provided by outputs of attack graphs that are used as node inputs 910, 920, and 930, respectively. The relationship between the M1 and M2 modes can be specified using the AND gate 902 to generate the output M12. The relationship between the M12 and M3 modes can be specified using the OR gate 904 to generate the output probability of the process level failure.

FIG. 10 illustrates an example fault tree representation 1000 for a remote station level failure. As illustrated, a remote station fails when a firewall is breached 1010 followed by failure of authentication and authorization 1020 and then a direct control of field devices 1030. As one example the controller can proactively perform a reconfiguration before the three steps represented by a priority AND 1040 are executed by the attacker to cause a failure of enterprise security. When an attack is suspected or detected (such as when the firewall breach 1010 and the authentication and authorization 1020 are likely to have occurred), firewall rules can be reordered, or privileges can be revoked, for example. Specifically, a cyber controller can reprogram (reconfigure) the firewall at the remote station with updated rules for the firewall. As described above, outputs of attack graphs can be used as inputs to the fault tree 1000.

Figure 11:
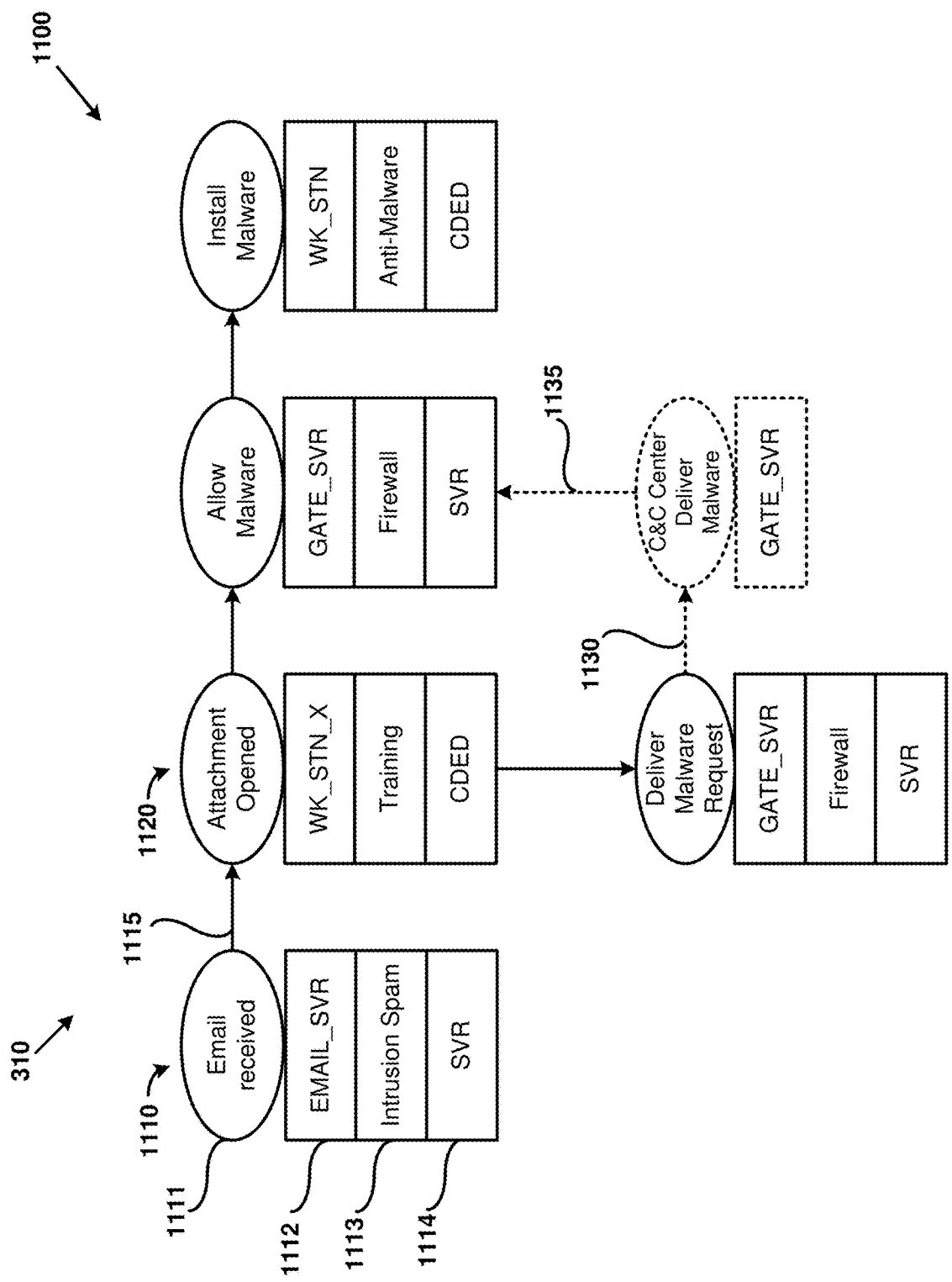
FIG. 11 illustrates an example attack graph identifying cybersecurity linkages to business functions, as can be implemented in certain examples of the disclosed technology.

FIG. 11 is a diagram 1100 illustrating an example attack graph 310 identifying cybersecurity linkages to business functions. An attack graph is a data structure representing a cyberattack of a system or sub-system. As one example, an attack graph can be implemented as a tree, a graph, or other suitable data structure that is stored in a computer-readable memory or storage device. An attack graph can be used to identify and analyze the elements and interactions of the different components of the attack surface. An attack graph can identify cybersecurity vulnerabilities and potential paths for a cyberattack to progress. An attack graph can include nodes corresponding to elements of an attack surface of a system (such as the system 100 of FIG. 1). The nodes of the attack graph (e.g. nodes 1110 and 1120) can be connected by edges (e.g. edge 1115) that correspond to relationships between the elements. As a specific example, an attack graph can trace a path for a malware attack of the system and can identify the elements of the attack surface that are compromised during the attack. The attack graph can link the elements of the attack surface to business functions, where the business functions can be analyzed using fault trees. For example, the output(s) of the attack graph can be used as input(s) to one or more fault trees. As one example, outputs of the attack graph can include probabilities that a cyberattack is underway at the equipment represented by each of the nodes of the attack graph. Specifically, each node of the attack graph can produce an output of the attack graph, where the output value represents a probability that the equipment represented by the mode is under cyberattack. The outputs of the nodes can be combined into a data structure, such as a vector, where each element of the vector represents the probability that the equipment is under cyberattack.

Attack graph analysis can use graph theoretic approaches to trace possible attack entry and penetration points, and paths that lead to exploitation of business functions. Attack graph analysis can be a method to feed into fault and event trees as they are amenable to probabilistic treatment. The attack graph 310 shows an example of an attack that installs malware on an enterprise workstation. Attack graphs can be used to analyze vulnerabilities of SCADA systems. To catalog a database of graphs, each node of the attack graph can carry information such as: an activity (e.g., 1111), the cyber asset on which the activity takes place (e.g., 1112), controls that can pass or fail (e.g., 1113), and the fault/event tree node (e.g., business function 1114) impacted. The graph can be complemented with advanced learning techniques to continuously assess the state of attack, especially when adversaries rely on autonomous mechanisms (e.g., Stuxnet). One challenge can be the potential number of such graphs required to anticipate against a universal set of attacks paths. In one implementation, the attack graphs can be implemented within a cyber controller that is separate from a risk module so that only the cyber controller is concerned with the implementation details of the attack graphs. This implementation can also encapsulate changes to the attack graphs (such as changes caused by a reconfiguration during a cyberattack) within the cyber controller. An interface from the cyber controller to the risk module can expose the cyber elements impacting the core business, by producing probabilities of attacks on the cyber elements as outputs of the cyber controller and as inputs to the risk module. Alternatively, the risk module and the cyber controller can be integrated into a single software module.

As illustrated, the attack graph nodes 1110 and 1120 refer to fault tree nodes SVR 640 and CDED 630, respectively, from the enterprise level 4 of FIG. 6. The cyber controller can be completely or partially autonomous. For example, the cyber controller can be autonomous at process level 0 through control level 2, and the cyber controller can be supervised (e.g., humans participate in reconfiguration decisions) at operations level 3 and enterprise level 4. A malware attack progresses when an email server EMAIL_SVR (attack graph node 1110) fails to detect an email with malicious intent through its intrusion detection feature. The attack graph node 1110 corresponding to the EMAIL_SVR component makes a reference to server category SVR in the enterprise system fault tree. The dotted lines 1130 and 1135 indicate communication with unauthorized systems external to the enterprise network (e.g. a command-and-control channel). The attack graph can identify and quantify a risk so that the cyber controller can find opportunities to reconfigure the system based on the current status and attacker's potential next steps as investigated by machine learning systems. The fault and event trees discussed herein support quantification using Boolean logic. Attack graph uncertainty quantification using public vulnerability databases can feed into fault/event tree events for propagation through the business to weigh end state consequences.

Example Methods of Risk-Informed Cyber Controllers

A cyber controller can provide an adaptive network-centric defense mechanism that can force an attacker to work around dynamic reconfigurations, potentially delaying the attacker's progress and increasing their visibility. The earliest point of defense can be a reconnaissance phase when the adversary surveys a system for vulnerabilities. Adaptive reconfiguration options can include traffic blocking, curtailing TCP connections, protecting address resolution caches, limiting outgoing traffic rate, and port and address hopping. Some of these techniques may have potential negative business impacts so alternative customizations can be considered. The adaptive cyber controller can make dynamic changes or reconfiguration to the business system network to mislead adversaries. Fault/event trees and attack graphs can be used to identify opportunities where such reconfigurations can be planned in advance of an adversary's potential next move. A table of permissible reconfiguration actions with critical attributes can be captured. This step can involve a walkthrough of the developed trees and concurrent development of a database of reconfiguration actions that sufficiently captures where an action can be taken, a unique identifier for reference during real time operations, the nature of change, and time duration for the change to take effect. Additional notes can help understand the impact of identified options on the business, e.g. assumptions, trigger criteria, and the interruption to service while changes take effect.

An objective of the risk module can be the ability to develop actionable risk estimates to inform the cyber controller of its potential deceitful moves to tackle an impending cyberattack. As described herein, a method can include systematically developing risk estimates that can be relied upon for decision-making. As one example, the risk module can receive either an observed attack path or the perceived current attack location from the cyber controller. Predictive attack paths can be traceable from the trees whose path vulnerability (pv) can be estimated. Path vulnerability can be a product of series of probabilities associated with exploiting vulnerabilities along the predictive path. This can be denoted as PATH1 for a specific predictive path. One objective can be to tabulate a number of reconfigurable alternative attack paths (e.g., PATH2, PATH3, and so forth) likely to result in lesser or no consequences as a result of implementing adaptive strategies. Strategies can let the adversary give up PATH1 and alternatives can be tabulated and assigned a unique identification number (S1, S2, and so forth). One included strategy can be the no-action option, which prevents or reduces the possibility of disruption due to reconfiguration. However, a consequence of no action is the associated restoration time contributing to the risk due to non-availability or failure of process equipment. The consequence could be customer service interruption, production loss, equipment damage, loss of reliability or health effects to workers and public. The cyber controller can attempt to prioritize human safety and fault tolerance to prevent loss of life or endangerment of public health or confidence, regulatory compliance, loss of equipment, loss of intellectual property, or lost or damaged products." It can be a challenge to quantify all different types of consequences using a single metric. One way to address this challenge is through the use of equivalence principles to translate consequences of different types into a single type. Another simplification method is to categorize actions based on differences in consequence type—economic, technical, and health.

Each adaptive strategy can refer to one or more possible action alternatives. For each such action, time to reconfigure and associated business/customer service consequences can be documented. Finally, a risk estimate ($R_a$) can be made for each alternative a based on available inputs as the product of predicted path vulnerability (pv), consequence (c), and the sum of restoration (t) or reconfiguration time (r):

$$R_a = pv * c * (r \text{ or } t) \tag{1}$$

Note that in case of an inaction, the restoration time may be substantial, whereas reconfiguration time is zero. In case of an alternative strategy, there is time duration associated with both reconfiguration and restoration (if any). There could still be consequence, though not as large as taking an inaction. The table of risk estimates, when sent back to the controller, allows for contextual selection of reconfiguration that can serve the business and mitigate attacks at the same time.

The use of a threat likelihood can be factored into the expressions with enough knowledge of the involved threat agent. The estimation of a threat likelihood can be based on a nature of the attacker, their intent, motivation, and sophistication. In an operational setting, the intrusion may already be known to have happened with some degree of confidence. So, the data for the attack likelihood may be less informative than the vulnerabilities in the anticipated attack path. For all practical purposes, it can be assumed with certainty that attack will continue.

As one example of a cyberattack, consider the 2015 Ukraine power grid attack. The following is an abridged set of events relevant for this study:

E1: a staff from one of the distribution companies fell victim to an unauthorized phishing email resulting in a malware being planted by a vicious C2C at the distribution company. The staff here are not within the enterprise network, rather access the network using a private network. Level 4 or enterprise network is the closest access point in the event tree.

E2: the malware enabled attackers to obtain access to Windows domain controllers in the enterprise network. Once again this is at the enterprise Level 4.

E3: the attackers obtained network credentials for remote access to the control center (supervisory control or Level 2).

E4: the attackers planted malicious code on control center servers, operator workstations, and substation firmware (basic control or Level 1).

E5: At the time of the event, attackers directed the malware to open mechanical circuit breakers leading to substations going offline and customers losing power. The harvested malware forced operators to be logged out and disabled automatic substation control. E5 is simultaneously happening at Level 1 and 2.

The business consequence was a loss of about 780 MWh of energy (approximately 1 GWh) apart from other deleterious effects such as bad reputation, loss of trust and irrecoverable data. The restoration time was about six hours. Though the events E1 through E5 represent a single branch of the event tree, the back and forth communication between adversary and the system is not captured. The path vulnerability can be analyzed until the event E1 for this example. The phishing attempt exploited vulnerability CVE-2014-4114 whose Common Vulnerability Scoring System (CVSS v3.0) assigns a base vulnerability score of 7.8 out of ten. While the CVSS score is not a probability, there are mechanisms to convert the CVSS score to a probability. The attack path constitutes: (E11) staff failing to identify unauthorized email (the likelihood is subjective), (E12) the attacker exploiting the vulnerability (probability from CVSS), (E13) downloading malware (detection probability at the firewall and along the chain) and (E14) installing the malware (ownership and permissions). If the cyber controller can detect the attempt to download malware using event management tools with some confidence, the following can be adaptive strategies: (1) do nothing, (2) stop harvesting the malicious code, or (3) reroute such that code is harvested in a sandbox without the attacker's notice. The first option maps to potential consequence of losing 1 GWh of energy (likely the most severe consequence borne by the business and probably the intention of the attacker) or theft of sensitive data whose value can be estimated in economic terms. Reconfiguration by the cyber controller using (2) or (3) in real-time allows for avoiding the consequence. In addition, (3) allows for learning more about the attacker's intentions and is also applicable for event E5.

Populating the terms in risk equation (1) with likelihood and consequence estimates with and without reconfiguration alternatives allows for the risk module to return the risk profile to the cyber controller for an informed decision. Table 1200 of FIG. 12 illustrates an example of risk estimation with and without a cyber controller. The data in table 1200 shows an example of how a cyber controller can potentially reduce a risk to a system during a cyberattack. As illustrated, events E11 through E12 have already occurred in the autonomous case. The malware has been detected in real-time and is ready to be rerouted to a sandbox. This attempt has a finite chance of failure, in which case, the system can be quarantined in relatively less time because the system knows malware exists. This is contrary to the non-autonomous case where existence of the malware itself might go undetected. The final risk estimates illustrate the benefit of an autonomous cyber controller taking into consideration failure possibilities associated with the proposed system as well.

The example illustrated in FIG. 12 demonstrates challenges involved with the method, namely, (1) access to probabilities (2) an uncertain attack path at different time instants, (3) uncertainties in estimating consequences, (4) strategies involving coordinated attacks, (5) estimation of detection probabilities, and (6) combinatorics associated with the impending attack path and possible adaptive strategies.

Figure 13:
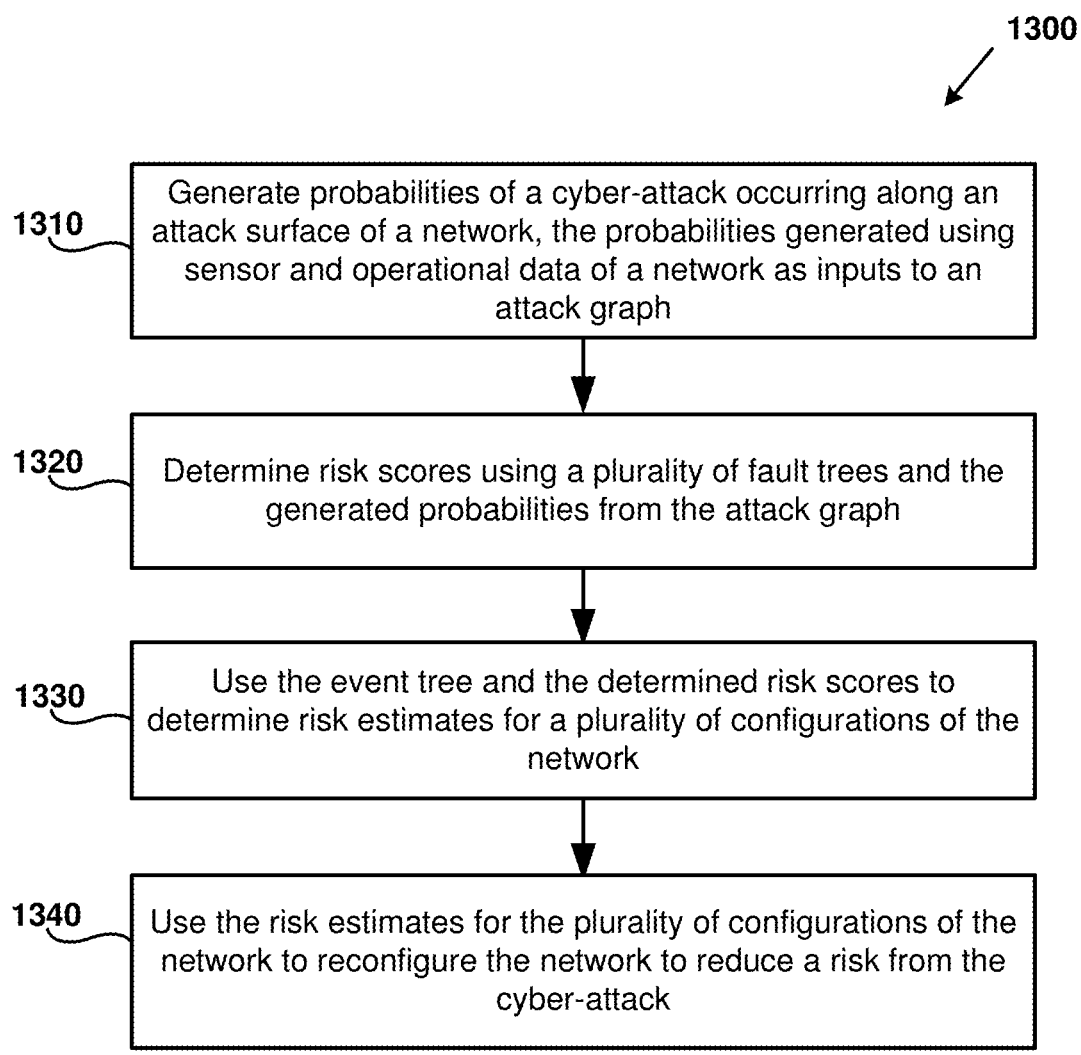
FIG. 13 illustrates a method of a risk-informed autonomous adaptive cyber controller, as can be implemented in certain examples of the disclosed technology.

FIG. 13 illustrates a method 1300 of using a risk-informed autonomous adaptive cyber controller, as can be implemented in certain examples of the disclosed technology. As one example, the method 1300 can be performed by a cyber controller and/or a risk module, such as the cyber controller 174 and risk module 176 of FIG. 1.

At process block 1310, probabilities of a cyber-attack occurring along an attack surface of a network can be generated. The probabilities can be generated using sensor and operational data of a network as inputs to an attack graph. The attack graph can include nodes corresponding to elements of the attack surface of the network. The output of the attack graph can include the probabilities that each node of the attack graph is under cyberattack. The attack graph can link the elements of the attack surface to business functions.

At process block 1320, risk scores can be determined using one or more fault trees and the generated probabilities from the attack graph. The attack graph can identify linkages to business functions that are represented by nodes of the fault trees. The nodes of the fault trees can represent business functions. Each of the fault trees can correspond to a different respective level of business coordination. For example, the levels of business coordination can include an enterprise system level, a business operations level, a supervisory control center level, a programmable logic controller level, and/or a process machinery level. The risk scores can indicate a vulnerability to a cyberattack. Specifically, the probabilities generated by the attack graph (indicating that equipment can be under cyberattack) can be propagated through the Boolean gates of the fault tree so that the probability (e.g., the risk score) of the business function being compromised can be generated by the fault tree. The respective risk scores can correspond to respective nodes of an event tree.

At process block 1330, the event tree and the determined risk scores can be used to determine risk estimates for a plurality of configurations of the network. The event tree can include branches for multiple levels of business coordination. The event tree can identify potential consequences for different respective configurations of the network. The risk estimates can indicate a cost of a successful cyberattack and/or for different reconfigurations of the network. The cost can be measured in economic (e.g., dollars), technical (e.g., Megawatt hours), and/or human health consequences.

At process block 1340, the risk estimates for the plurality of configurations of the network can be used to reconfigure the network to reduce a risk from the cyber-attack. Reconfiguring the network can include changing settings of a firewall of the network, harvesting code in a sandbox, blocking a network address, and/or blocking a network port.

Figure 14:
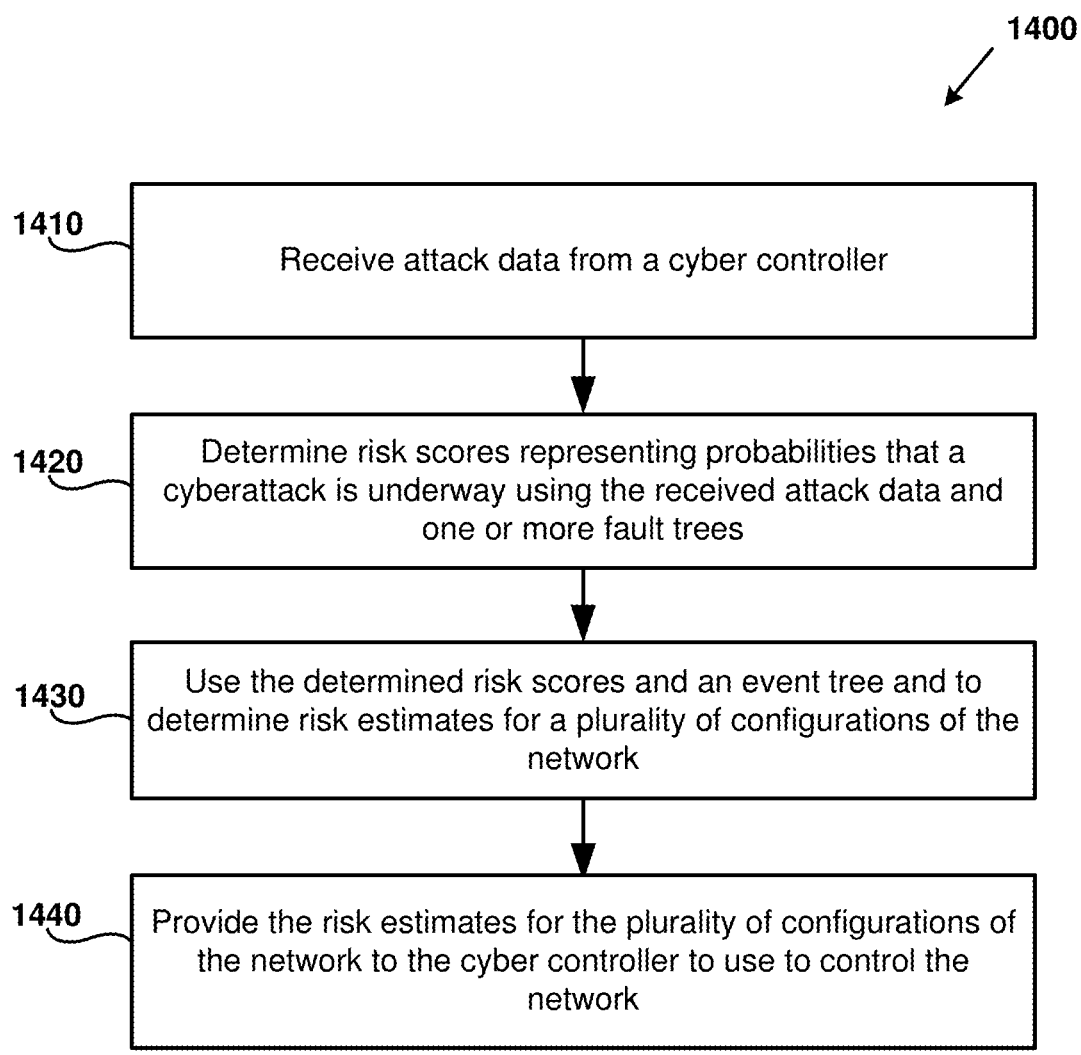
FIG. 14 illustrates a method of a risk module in communication with a cyber controller, as can be implemented in certain examples of the disclosed technology.

FIG. 14 illustrates an example method 1400 of using a risk module in communication with a cyber controller. As one example, the method 1400 can be performed by the risk module 176 and the cyber controller 174 of FIG. 1.

At process block 1410, attack data can be received from the cyber controller. The attack data can include probabilities that respective elements of an attack surface of the network are being attacked. The probabilities can be generated using sensor and operational data of a network as inputs to an attack graph. The attack graph can include nodes corresponding to elements of the attack surface of the network. The output of the attack graph can include the probabilities that each node of the attack graph is under cyberattack. The attack graph can link the elements of the attack surface to business functions.

At process block 1420, risk scores representing probabilities that a cyberattack is underway can be determined using the received attack data and one or more fault trees. The respective risk scores can correspond to respective nodes of an event tree. The attack graph can identify linkages to business functions that are represented by nodes of the fault trees. The nodes of the fault trees can represent business functions. Each of the fault trees can correspond to a different respective level of business coordination. For example, the levels of business coordination can include an enterprise system level, a business operations level, a supervisory control center level, a programmable logic controller level, and/or a process machinery level. The risk scores can indicate a vulnerability to a cyberattack. Specifically, the probabilities generated by the attack graph (indicating that equipment can be under cyberattack) can be propagated through the Boolean gates of the fault tree so that the probability (e.g., the risk score) of the business level being compromised can be generated by the fault tree.

At process block 1430, the determined risk scores and an event tree can be used and to determine risk estimates for a plurality of configurations of the network. The event tree can include branches for multiple levels of business coordination. The event tree can identify potential consequences for different respective configurations of the network. The risk estimates can indicate a cost of a successful cyberattack and/or for different reconfigurations of the network. The cost can be measured in economic (e.g., dollars), technical (e.g., Megawatt hours), and/or human health consequences.

At process block 1440, the risk estimates for the plurality of configurations of the network can be provided to the cyber controller to use to control the network. Accordingly, the risk module can inform the cyber controller of cyber risks so that the cyber controller can control the network based on risk estimates.

Making autonomous systems cyber-secure in a risk-informed decision-making context can be challenging due to completeness uncertainty (e.g., identifying every attack path may not be pragmatic). A solution to addressing this challenge can be the establishment of a program that allows for multi-stakeholder feedback and continuous improvement. Threat landscapes can be dynamic and so the developed trees and graphs are likely to be updated during the lifetime of the business. The framework described herein allows for logical separation of business logic, causal reasoning, and cyberattack paths so that more dynamic structures (e.g., attack graphs) can receive more frequent updates. An over-reliance on quantified risk estimates can be detrimental to the functioning of the cyber controller. PRA can be helpful both in risk quantification and in the rigor followed in estimating risks through the development and analysis of trees and graphs. Finally, the risk module can be modified to analyze the inputs that are available from the cyber controller, namely, traces of an ongoing attack or at least the location in the presence of uncertainties. Reconfiguration alternatives for adaptiveness can be huge in number given the combinatorics associated with solutions available at each step. This number is likely to be even larger as the point of attack is farther from Level 0. A way to address this challenge is to let the operating plan establish rules and bounds over the set of possible reconfiguration solution sets. An approach to reduce the number of potential attack paths is to use truncation based on path vulnerabilities and situational awareness. When developed, characterized, and routinely updated, the trees and graphs-based risk-informed controller can provide robust adaptiveness to autonomous missions.

The technology described herein provides a framework for risk-informing a cyber controller in an operational setting considering a business with enterprise-control architecture laid out in the IEC 62264-1 Standard. A combination of event trees for tracing attacks through business functions, fault trees for causative analysis associated with each business function, and cyberattack graphs to provide linkages to fault trees can be used to trace and map cyber elements with business operations. The framework can be complemented with a methodology to formulate reconfiguration alternatives given some contextual attack information in real-time. The usefulness of the framework can include a methodology for estimation of risk associated with impending attack paths along with estimates for adaptive actions to confuse an adversary. A risk module interfacing with a cyber controller can be used in applications in various sectors including advanced nuclear reactors, manufacturing settings, power systems, remote-controlled dams, and defense establishments, for example.

Example Computing Environment

Figure 15:
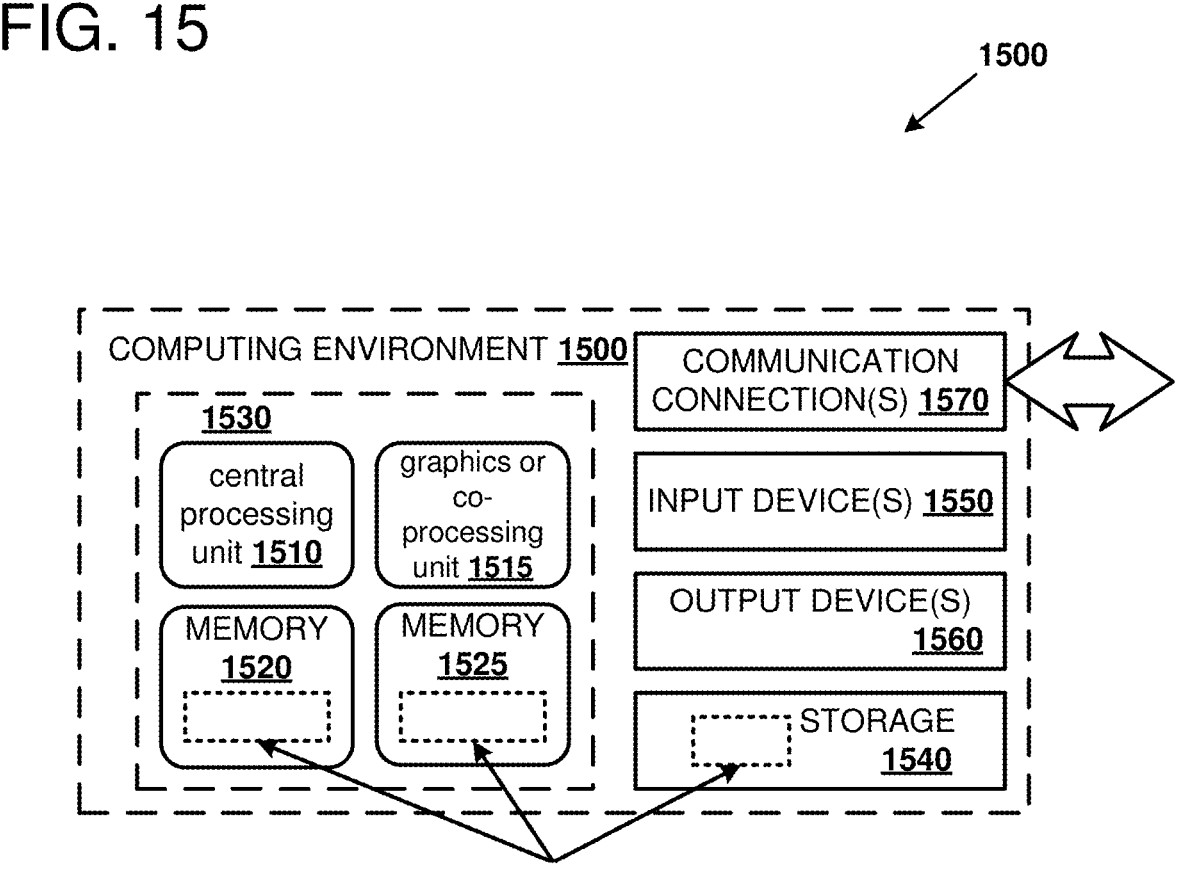
FIG. 15 illustrates a generalized example of a suitable computing environment in which the described innovations may be implemented.

FIG. 15 depicts a generalized example of a suitable computing environment 1500 in which the described innovations may be implemented. The computing environment 1500 is not intended to suggest any limitation as to scope of use or functionality, as the innovations may be implemented in diverse general-purpose or special-purpose computing systems. For example, the computing environment 1500 can be any of a variety of computing devices (e.g., desktop computer, laptop computer, server computer, tablet computer, etc.).

With reference to FIG. 15, the computing environment 1500 includes one or more processing units 1510, 1515 and memory 1520, 1525. In FIG. 15, this basic configuration 1530 is included within a dashed line. The processing units 1510, 1515 execute computer-executable instructions. A processing unit can be a general-purpose central processing unit (CPU), a processor in an application-specific integrated circuit (ASIC) or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), non-volatile memory (e.g., ROM, EEPROM, flash memory, etc.), or some combination of the two, accessible by the processing unit(s). The memory 1520, 1525 stores software 1580 implementing one or more innovations described herein, in the form of computer-executable instructions suitable for execution by the processing unit(s).

A computing system may have additional features. For example, the computing environment 1500 includes storage 1540, one or more input devices 1550, one or more output devices 1560, and one or more communication connections 1570. An interconnection mechanism (not shown) such as a bus, controller, or network interconnects the components of the computing environment 1500. Typically, operating system software (not shown) provides an operating environment for other software executing in the computing environment 1500, and coordinates activities of the components of the computing environment 1500.

The tangible storage 1540 may be removable or non-removable, and includes magnetic disks, magnetic tapes or cassettes, CD-ROMs, DVDs, or any other medium which can be used to store information in a non-transitory way and which can be accessed within the computing environment 1500. The storage 1540 stores instructions for the software 1580 implementing one or more innovations described herein. As used herein, "computer-readable media" are any available media that can be accessed within the computing environment 1500. By way of example, and not limitation, with the computing environment 1500, computer-readable media include memory 1520 and/or storage 1540. As should be readily understood, the term computer-readable storage media includes the media for data storage such as memory 1520 and storage 1540, and not transmission media such as modulated data signals.

The input device(s) 1550 may be a touch input device such as a keyboard, mouse, pen, or trackball, a voice input device, a scanning device, or another device that provides input to the computing environment 1500. The output device(s) 1560 may be a display, printer, speaker, CD-writer, or another device that provides output from the computing environment 1500.

The communication connection(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term "computer-readable storage media" does not include intangible communication connections, such as signals and carrier waves. Any of the computer-executable instructions for implementing the disclosed techniques as well as any data created and used during implementation of the disclosed examples can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood to one of ordinary skill in the relevant art having the benefit of the present disclosure that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood to one of ordinary skill in the relevant art having the benefit of the present disclosure that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed examples, alone and in various combinations and subcombinations with one another. The disclosed methods, apparatus, and systems are not limited to any specific aspect or feature or combination thereof, nor do the disclosed examples require that any one or more specific advantages be present or problems be solved.

In view of the many possible examples to which the principles of the disclosed technology may be applied, it should be recognized that the illustrated examples are only preferred examples and should not be taken as limiting the scope of the claimed subject matter to those preferred examples. Rather, the scope of the claimed subject matter is defined by the following claims. We therefore claim as our invention all that comes within the scope of these claims.

What is claimed is:
1. A system comprising:
 a cyber controller configured to monitor the system and configured to control a network of the system, the cyber controller generating attack data based on an attack graph; and
 a processor executing computer-readable instructions in communication with the cyber controller, the instructions causing the processor to:
  receive the attack data from the cyber controller,
  provide the attack data as inputs to one or more fault trees representing business functions, and using the one or more fault trees, determine risk scores for the respective business functions, the respective risk scores representing a probability that a cyberattack involving the business function is underway,
  provide the risk scores for the respective business functions as an input to an event tree identifying potential consequences of a plurality of configurations of the network and use the provided risk scores and the event tree to determine risk estimates for the plurality of configurations of the network, and provide the risk estimates for the plurality of configurations of the network to the cyber controller to use to control the network.

2. The system of claim 1, wherein the cyber controller is an adaptive autonomous cyber controller.

3. The system of claim 1, wherein the attack data received from the cyber controller includes data indicating probabilities that respective elements of an attack surface of the network are being attacked.

4. The system of claim 1, wherein the event tree includes branches for multiple levels of business coordination.

5. The system of claim 1, wherein the cyber controller is further configured to reconfigure the network based on the risk estimates for the plurality of configurations of the network.

6. The system of claim 1, wherein the attack graph comprises nodes corresponding to elements of an attack surface of the network, and wherein the attack graph links the elements of the attack surface to business functions.

7. The system of claim 6, wherein the business functions are represented by nodes of the one or more fault trees.

8. The system of claim 1, wherein each of the fault trees corresponds to a different respective level of business coordination.

9. The system of claim 8, wherein the levels of business coordination include at least one of: an enterprise system level, a business operations level, a supervisory control center level, a programmable logic controller level, or a process machinery level.

10. A computer-implemented method comprising:
    generating probabilities of a cyber-attack occurring along an attack surface of a network, the probabilities generated using sensor and operational data of a network as inputs to an attack graph;
    providing the generated probabilities as input to a plurality of fault trees representing business functions and using the plurality of fault trees and generated probabilities, determining risk scores for the respective business functions, the respective risk scores corresponding to respective nodes of an event tree;
    providing the risk scores for the respective business functions as an input to the event tree identifying potential consequences of a plurality of configurations of the network and using the event tree and the risk scores, determining risk estimates for the plurality of configurations of the network; and
    using the risk estimates for the plurality of configurations of the network to reconfigure the network to reduce a risk from the cyber-attack.

11. The method of claim 10, wherein the attack graph identifies linkages to the business functions that are represented by the plurality of fault trees.

12. The method of claim 10, wherein the event tree includes branches for multiple levels of business coordination.

13. The method of claim 10, wherein each of the plurality of fault trees corresponds to a different respective level of business coordination.

14. The method of claim 13, wherein the levels of business coordination include at least one of: an enterprise system level, a business operations level, a supervisory control center level, a programmable logic controller level, and a process machinery level.

15. One or more computer-readable storage media storing computer-readable instructions that upon execution by a computer, cause the computer to perform a method, the instructions comprising:
    instructions that cause the computer to generate at least one attack probability from an attack graph that uses sensor and operational data of a network as input to the attack graph;
    instructions that cause the computer to provide the at least one attack probability as input to a plurality of fault trees representing business functions and using the plurality of fault trees and the at least one attack probability, determine risk scores for different levels of business coordination, wherein a respective fault tree represents a different respective level of business coordination;
    instructions that cause the computer to provide the risk scores for the different levels of business coordination as an input to an event tree identifying potential consequences of a plurality of configurations of the network and determine risk estimates for the plurality of configurations of the network using the event tree and the risk scores; and
    instructions that cause the computer to reconfigure the network based on the risk estimates for the plurality of configurations of the network.

16. The one or more computer-readable storage media of claim 15, wherein the instructions cause the computer to reconfigure the network by harvesting code in a sandbox.

17. The one or more computer-readable storage media of claim 15, wherein the instructions cause the computer to reconfigure the network by blocking a network address.

18. The one or more computer-readable storage media of claim 15, wherein the instructions cause the computer to reconfigure the network by blocking a network port.

19. The one or more computer-readable storage media of claim 15, wherein the instructions cause the computer to reconfigure the network by changing settings of a firewall of the network.

* * * * *

UNITED STATES PATENT AND TRADEMARK OFFICE
CERTIFICATE OF CORRECTION

| | |
|---|---|
| PATENT NO. | : 11,206,278 B2 |
| APPLICATION NO. | : 16/432655 |
| DATED | : December 21, 2021 |
| INVENTOR(S) | : Veeramany et al. |

It is certified that error appears in the above-identified patent and that said Letters Patent is hereby corrected as shown below:

In the Specification

At Column 1, Line 52, "sent sores" should read --sent scores--.

At Column 2, Line 4, "that a cyber at his under away" should read --that a cyber attack is under way--.

At Column 15, Line 41, "system be represented" should read --system represented--.

At Column 20, Line 20, "alternative a based" should read --alternative *a* based--.

Signed and Sealed this
Twenty-fourth Day of May, 2022

Katherine Kelly Vidal
*Director of the United States Patent and Trademark Office*